US012006017B2

(12) United States Patent
Shin et al.

(10) Patent No.: US 12,006,017 B2
(45) Date of Patent: Jun. 11, 2024

(54) BOIL-OFF GAS RELIQUEFICATION APPARATUS AND METHOD FOR VESSEL

(71) Applicant: DAEWOO SHIPBUILDING & MARINE ENGINEERING CO., LTD., Geoje-si (KR)

(72) Inventors: Hyun Jun Shin, Seoul (KR); Su Kyung An, Gwangmyeong-si (KR); Seung Chul Lee, Seoul (KR)

(73) Assignee: HANWHA OCEAN CO., LTD., Geoje-si (KR)

(*) Notice: Subject to any disclaimer, the term of this patent is extended or adjusted under 35 U.S.C. 154(b) by 92 days.

(21) Appl. No.: 17/148,182

(22) Filed: Jan. 13, 2021

(65) Prior Publication Data

US 2021/0129970 A1 May 6, 2021

Related U.S. Application Data

(63) Continuation of application No. 16/090,115, filed as application No. PCT/KR2016/011007 on Sep. 30, 2016, now abandoned.

(30) Foreign Application Priority Data

Mar. 31, 2016 (KR) ........................ 10-2016-0039516

(51) Int. Cl.
*F17C 9/04* (2006.01)
*B63B 25/16* (2006.01)
(Continued)

(52) U.S. Cl.
CPC ................. *B63J 2/14* (2013.01); *B63B 25/16* (2013.01); *F02M 21/0215* (2013.01); *F17C 6/00* (2013.01);
(Continued)

(58) Field of Classification Search
CPC .......... F25J 1/0025; F25J 1/004; F25J 1/0202; F25J 1/0296; F25J 1/023; F25J 1/0277;
(Continued)

(56) References Cited

U.S. PATENT DOCUMENTS 4,727,723 A 3/1988 Durr
6,898,949 B2 5/2005 Paradowski
(Continued)

FOREIGN PATENT DOCUMENTS

CN 103703299 A 4/2014
CN 104864681 A 8/2015
(Continued)

OTHER PUBLICATIONS

Written Opinion of Singaporean Patent Application No. 11201808336S—9 pages (dated Feb. 18, 2020).
(Continued)

*Primary Examiner* — Frantz F Jules
*Assistant Examiner* — Webeshet Mengesha
(74) *Attorney, Agent, or Firm* — K&L Gates LLP

(57) ABSTRACT

Disclosed is a re-liquefying device using a boil-off gas as a cooling fluid so as to reliquefy the boil-off gas generated from a liquefied gas storage tank provided in a ship. A boil-off gas re-liquefying device for a ship comprises: a multi-stage compression unit for compressing boil-off gas generated from a liquefied gas storage tank; a heat exchanger in which the boil-off gas generated from the storage tank and the boil-off gas compressed exchange heat; a vaporizer for heat exchanging the boil-off gas cooled by the heat exchanger and a separate liquefied gas supplied to a fuel demand source of a ship, and thus cooling the boil-off gas; an intermediate cooler for cooling the boil-off gas that has been cooled by the heat exchanger; and an expansion
(Continued)

means for branching a part of the boil-off gas, which is supplied to the intermediate cooler, and expanding the same.

6 Claims, 8 Drawing Sheets

(51) Int. Cl.
*B63J 2/14* (2006.01)
*F02M 21/02* (2006.01)
*F17C 6/00* (2006.01)
*F17C 9/02* (2006.01)
*F25J 1/00* (2006.01)

(52) U.S. Cl.
CPC .................. *F17C 9/02* (2013.01); *F17C 9/04* (2013.01); *F17C 2221/033* (2013.01); *F17C 2227/0164* (2013.01); *F17C 2227/0185* (2013.01); *F17C 2227/0339* (2013.01); *F17C 2227/0348* (2013.01); *F17C 2227/0358* (2013.01); *F17C 2265/033* (2013.01); *F17C 2265/034* (2013.01); *F17C 2265/037* (2013.01); *F17C 2265/038* (2013.01); *F17C 2265/066* (2013.01); *F17C 2270/0105* (2013.01); *F25J 1/0025* (2013.01)

(58) Field of Classification Search
CPC ...... F17C 6/00; F17C 9/02; F17C 7/00; F17C 2227/036; F17C 2227/0157; F17C 2227/0339; F17C 2227/0358; F17C 2227/0351; F17C 2227/0185; B63B 25/16
See application file for complete search history.

(56) References Cited

U.S. PATENT DOCUMENTS

| | | | | |
|---|---|---|---|---|
| 2014/0083132 A1 | | 3/2014 | Maunder | |
| 2014/0102133 A1 | * | 4/2014 | Duckett | F25J 1/0277 62/48.2 |
| 2014/0123699 A1 | | 5/2014 | Duckett | |
| 2014/0290279 A1 | | 10/2014 | Lee | |
| 2015/0330574 A1 | * | 11/2015 | Fuchs | F25J 1/0265 62/48.2 |
| 2016/0216029 A1 | * | 7/2016 | Ragot | B63B 25/16 |

FOREIGN PATENT DOCUMENTS

| | | | | |
|---|---|---|---|---|
| CN | 105008834 | A | | 10/2015 |
| CN | 204963420 | U | | 1/2016 |
| JP | 2014511469 | A | | 5/2014 |
| KR | 101298623 | B1 | * | 8/2013 |
| KR | 10-1334002 | B1 | | 11/2013 |
| KR | 10-1459962 | B1 | | 11/2014 |
| KR | 101459962 | B1 | | 11/2014 |
| KR | 10-1496577 | B1 | | 2/2015 |
| KR | 10-2015-0039427 | A | | 4/2015 |
| KR | 10-1519541 | B1 | | 5/2015 |
| KR | 20150062791 | A | | 6/2015 |
| KR | 10-2015-0080087 | A | | 9/2015 |
| KR | 10-2015-0125634 | A | | 11/2015 |
| KR | 20150125634 | A | | 11/2015 |
| WO | WO2009107743 | A | | 9/2009 |
| WO | WO 2015/130122 | A1 | | 9/2015 |

OTHER PUBLICATIONS

Office Action of corresponding Chinese Patent Application No. 201680084270.2—8 pages (dated Jun. 8, 2020).
Witt, "Onboard Reliquefaction of LNG Boil-off", 979 Trans. of Inst. of Marine Eng. vol. 92, No. 2, London—14 pages (1980).
Extended European Search Report of European Patent Application No. 16897185.1—7 pages (dated Oct. 31, 2019).
International Search Report of corresponding Patent Application No. PCT/KR2016/011007—6 pages (dated Dec. 28, 2016).
Notice of Allowance of Korean Patent Application No. 10-2016-0134125—1 page (dated Jul. 26, 2017).
Office Action of Japanese Patent Application No. 2018-549834—6 pages (dated Oct. 29, 2020).

* cited by examiner

BOIL-OFF GAS RELIQUEFICATION APPARATUS AND METHOD FOR VESSEL

TECHNICAL FIELD

The present invention relates to an apparatus and method for reliquefaction of boil-off gas generated in an LNG storage tank applied to a ship.

BACKGROUND ART

Generally, natural gas is liquefied and transported over a long distance in the form of liquefied natural gas (LNG). Liquefied natural gas is obtained by cooling natural gas to a very low temperature of about −163° C. at atmospheric pressure and is well suited to long-distance transportation by sea, since the volume of the natural gas is significantly reduced as compared with the natural gas in a gaseous phase.

On the other hand, liquefied petroleum gas (LPG) is also referred to as liquefied propane gas and is obtained by cooling natural gas obtained together with crude oil from oil fields to about −200° C. or by compressing the natural gas at about 7 to 10 atmospheres at room temperature.

Petroleum gas is mainly composed of propane, propylene, butane, butylene, and the like. When propane is liquefied at about 15° C., the volume of propane is reduced to about 1/260, and when butane is liquefied at about 15° C., the volume of butane is reduced to about 1/230. Thus, the petroleum gas is used in the form of liquefied petroleum gas for convenience of storage and transportation.

In general, liquefied petroleum gas has a higher heating value than liquefied natural gas and contains a large amount of components having higher molecular weights than those of liquefied natural gas. Thus, the liquefied petroleum gas allows easier liquefaction and gasification than the liquefied natural gas.

Liquefied gas, such as liquefied natural gas, liquefied petroleum gas, and the like, is stored in a tank and supplied to a demand site on land. Even when a storage tank is insulated, there is a limit to completely block external heat. Thus, liquefied natural gas is continuously vaporized in the storage tank by heat transferred into the storage tank. Liquefied natural gas vaporized in the storage tank is referred to as boil-off gas (BOG).

If the pressure in the storage tank exceeds a predetermined pressure due to generation of BOG, the BOG is discharged from the storage tank to be used as fuel for an engine or to be reliquefied and returned to the storage tank.

DISCLOSURE

Technical Problem

In order to reliquefy BOG containing ethane, ethylene and the like as main components (hereinafter referred to as "ethane BOG"), the ethane BOG must be cooled to about −100° C. or less and thus requires additional cold heat, as compared with the case of reliquefying BOG of liquefied petroleum gas having a liquefaction point of about −25° C. Thus, an independent refrigerant cycle for supplying additional cold heat is added to an LPG reliquefaction system to be used as an ethane reliquefaction process. For the refrigerant cycle for supplying additional cold heat, a general propylene refrigerant cycle is used.

The present invention is aimed at providing an apparatus and method for reliquefaction of BOG for ships, which can reliquefy BOG such as ethane without a separate independent refrigerant cycle.

Technical Solution

In accordance with one aspect of the present invention, there is provided a BOG reliquefaction apparatus provided to a ship for transportation of liquefied gas, including: a multistage compressor including a plurality of compression stage part and compressing BOG discharged from a storage tank storing liquefied gas; a heat exchanger cooling the BOG compressed by the multistage compressor through heat exchange of the BOG compressed by the multistage compressor with the BOG discharged from the storage tank; a vaporizer cooling the BOG through heat exchange of the BOG cooled by the heat exchanger with liquefied gas to be supplied to a fuel demand site in the ship; an intermediate cooler cooling the BOG cooled by the heat exchanger; and an expansion unit expanding some BOG branched off from the BOG to be supplied to the intermediate cooler, wherein the remaining BOG supplied to the intermediate cooler is cooled by the intermediate cooler through heat exchange with the BOG expanded by the expansion unit and is then returned back to the storage tank.

The intermediate cooler may include at least one of a first intermediate cooler disposed upstream of the vaporizer and additionally cooling the BOG cooled by the heat exchanger before the BOG is supplied to the vaporizer; and a second intermediate cooler disposed downstream of the vaporizer and additionally cooling the BOG cooled by the vaporizer.

The expansion unit may include at least one of a first expansion unit expanding some BOG branched off from the BOG to be supplied to the first intermediate cooler; and a second expansion unit expanding some BOG branched off from the BOG to be supplied to the second intermediate cooler.

The BOG reliquefaction apparatus may further include: a third expansion unit disposed downstream of the vaporizer or the second intermediate cooler and expanding the BOG having passed through the vaporizer or the second intermediate cooler; and a gas/liquid separator disposed downstream of the third expansion unit.

The compression stage parts may be arranged in series and a flow of the BOG expanded by the first expansion unit and a flow of the BOG expanded by the second expansion unit may be supplied between different compression stage parts among the plurality of compression stage parts such that the flow of the BOG expanded by the first expansion unit can be supplied to a compression stage part disposed farther downstream than a compression stage part to which the BOG expanded by the second expansion unit is supplied.

The multistage compressor may be a four-stage compressor.

A flow of the BOG having passed through the second expansion unit and the second intermediate cooler may be supplied downstream of a first compression stage part of the four-stage compressor.

The BOG supplied downstream of the first compression stage part may have a pressure of 2 bar to 5 bar.

A flow of the BOG having passed through the first expansion unit and the first intermediate cooler may be supplied downstream of a second compression stage part of the four-stage compressor.

The BOG supplied downstream of the second compression stage part may have a pressure of 10 to 15 bar.

The BOG may include at least one of ethane, ethylene, propylene, and LPG.

The liquefied gas to be supplied to the fuel demand site may be at least one of ethane, ethylene, propylene, and LPG.

In accordance with another aspect of the present invention, there is provided a BOG reliquefaction apparatus provided to a ship for transportation of liquefied gas, including: a storage tank storing liquefied gas; a heat exchange unit disposed downstream of the storage tank; a multistage compressor disposed downstream of the heat exchange unit and compressing BOG discharged from the heat exchanger; a third expansion unit disposed downstream of the heat exchange unit and generating a gas-liquid mixture through expansion of some of the BOG having passed through the multistage compressor and the heat exchange unit; a gas/liquid separator disposed downstream of the third expansion unit and separating the gas-liquid mixture discharged from the third expansion unit into gas and liquid, wherein the multistage compressor includes a plurality of compression stage parts arranged in series, the heat exchange unit includes: a heat exchanger cooling the BOG discharged from the multistage compressor through heat exchange of the BOG discharged from the storage tank and the gas/liquid separator with the BOG discharged from the multistage compressor; a first intermediate cooler additionally cooling the BOG supplied through the multistage compressor and the heat exchanger; a first expansion unit disposed between the heat exchanger and the first intermediate cooler and expanding some BOG branched off from the BOG to be supplied to the first intermediate cooler; a vaporizer disposed between the first intermediate cooler and the third expansion unit and vaporizing liquefied gas supplied through the different path through heat exchange between some of the BOG discharged from the first intermediate cooler and the liquefied gas supplied through the different path; and a fuel demand site receiving the liquefied gas vaporized by the vaporizer, wherein the BOG cooled by the first expansion unit among the BOG supplied to the first intermediate cooler and the BOG directly supplied to the first intermediate cooler instead of being supplied to the first expansion unit among the BOG supplied to the first intermediate cooler are subjected to heat exchange in the first intermediate cooler.

In accordance with a further aspect of the present invention, there is provided a BOG reliquefaction method for ships for transportation of liquefied gas, including: supplying BOG discharged from a storage tank storing liquefied gas to a multistage compressor to compress the BOG; cooling the compressed BOG with the BOG discharged from the storage tank; and returning the cooled BOG to the storage tank after heat exchange with liquefied gas to be supplied to a fuel demand site of the ship, wherein the compressed BOG is returned back to the storage tank after the remaining compressed BOG not branched off is cooled at least once using BOG obtained by expanding some BOG branched off from the compressed BOG, before or after heat exchange with the liquefied gas to be supplied to the fuel demand site.

The expanded BOG obtained by cooling the remaining compressed BOG not branched off may be supplied to and compressed by at least one of the plurality of compression stage parts in the multistage compressor.

BOG obtained through heat exchange after expansion of the compressed BOG before vaporization of the liquefied gas to be supplied to the fuel demand site may be supplied farther downstream of the compression stage part of the multistage compressor than BOG obtained through heat exchange after expansion of the compressed BOG after vaporization of the liquefied gas.

In accordance with yet another aspect of the present invention, there is provided a BOG reliquefaction method for a ship for transportation of liquefied gas, the ship being provided with a four-stage compressor for compressing BOG discharged from a storage tank storing liquefied gas, wherein the BOG discharged from the storage tank is compressed by the four-stage compressor, cooled through heat exchange, and separately supplied downstream of a first compression stage part and a second compression stage part of the four-stage compressor.

In accordance with yet another aspect of the present invention, there is provided a BOG reliquefaction method for a ship for transportation of liquefied gas, including: supplying BOG discharged from a storage tank storing liquefied gas to a multistage compressor to compress the BOG; primarily cooling the compressed BOG with the BOG discharged from the storage tank; dividing and expanding at least some BOG branched off from the primarily cooled BOG to secondarily cool the at least some BOG branched off from the primarily cooled BOG; dividing and expanding at least some BOG branched off from the secondarily cooled BOG to thirdly cool the at least some BOG branched off from the secondarily cooled BOG; and separately supplying decompressed BOG discharged after secondarily cooling the BOG and decompressed BOG discharged after thirdly cooling the BOG to the multistage compressor, wherein the decompressed BOG discharged after secondarily cooling is supplied farther downstream of the compression stage part of the multistage compressor than the decompressed BOG discharged after thirdly cooling.

Advantageous Effects

The BOG reliquefaction apparatus and method for ships according to the present invention can reduce installation costs by omitting a separate independent refrigerant cycle and is adapted to reliquefy BOG through self-heat exchange of BOG, such as ethane and the like, thereby providing the same level of reliquefaction efficiency as a typical reliquefaction apparatus even without an additional refrigerant cycle.

In addition, the BOG reliquefaction apparatus and method for ships according to the present invention can reduce power consumption for operation of a refrigerant cycle by omitting a separate independent refrigerant supply cycle.

Further, the BOG reliquefaction apparatus and method for ships according to the present invention allows use of various refrigerants for reliquefaction of BOG to reduce a refrigerant flux branched off upstream of a heat exchanger. When the refrigerant flux branched off upstream of the heat exchanger is reduced, BOG branched off to be used as a refrigerant is subjected to compression in a multistage compressor, thereby reducing the flux of the BOG compressed by the multistage compressor. When the flux of the BOG compressed by the multistage compressor is reduced, it is possible to reduce power consumption of the multistage compressor while allowing reliquefaction of the BOG with substantially the same reliquefaction efficiency.

BEST MODE

Hereinafter, embodiments of the present invention will be described in detail with reference to the accompanying drawings. A BOG reliquefaction apparatus and method according to the present invention may be applied in various ways to overland systems and ships, such as ships with LNG cargo, particularly, all types of ships and marine structures provided with a storage tank storing low-temperature liquid cargo or liquefied gas, including ships, such as LNG carriers, liquefied ethane gas carriers, and LNG RVs, and marine structures, such as LNG FPSOs and LNG FSRUs.

In addition, a fluid in each line according to the present invention may be in a liquid phase, in a gas/liquid mixed phase, in a gas phase, or in a supercritical fluid phase depending upon system operation conditions.

Further, liquefied gas stored in a storage tank 10 may be liquefied natural gas (LNG) or liquefied petroleum gas (LPG), and may include at least one component of methane, ethane, ethylene, propylene, heavy hydrocarbon, and the like.

Further, the following exemplary embodiments may be modified in various different ways and the present invention is not limited thereto.

Figure 1:
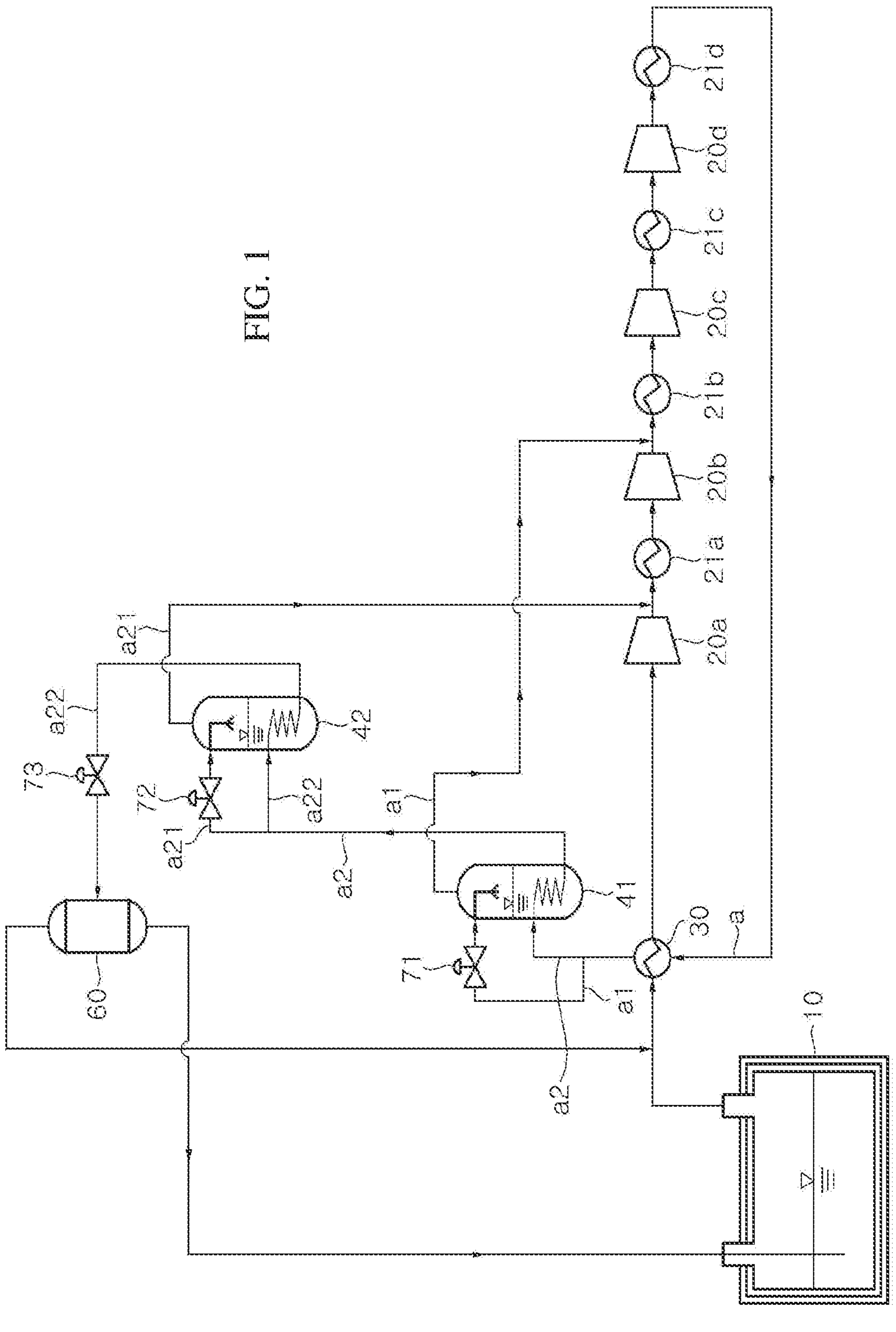
FIG. 1 is a schematic diagram of a BOG reliquefaction apparatus for ships according to a first exemplary embodiment of the present invention.

FIG. 1 is a schematic diagram of a BOG reliquefaction apparatus for ships according to a first exemplary embodiment of the present invention.

Referring to FIG. 1, a BOG reliquefaction apparatus for ships according to this exemplary embodiment includes: a multistage compressor 20*a*, 20*b*, 20*c*, 20*d* compressing BOG discharged from the storage tank 10 through multiple stages; a heat exchanger 30 cooling the BOG compressed by the multistage compressor 20*a*, 20*b*, 20*c*, 20*d* through heat exchange between the BOG compressed in multiple stages by the multistage compressor 20*a*, 20*b*, 20*c*, 20*d* and the BOG discharged from the storage tank 10; a first expansion unit 71 expanding the BOG compressed by the multistage compressor 20*a*, 20*b*, 20*c*, 20*d* and having passed through the heat exchanger 30; a first intermediate cooler 41 cooling the BOG compressed by the multistage compressor 20*a*, 20*b*, 20*c*, 20*d* and having passed through the heat exchanger 30; a second expansion unit 72 expanding the BOG having passed through the first intermediate cooler 41; a second intermediate cooler 42 cooling the BOG having passed through the first intermediate cooler 41; a third expansion unit 73 expanding the BOG having passed through the second intermediate cooler 42; and a gas/liquid separator 60 separating the BOG, which has been subjected to partial reliquefaction while passing through the third expansion unit 73, into reliquefied BOG and gaseous BOG.

According to this exemplary embodiment, the storage tank 10 stores liquefied gas, such as ethane, ethylene, and the like, and discharges BOG, which is generated through vaporization of the liquefied gas by heat transferred from the outside, when the internal pressure of the storage tank 10 exceeds a predetermined pressure. Although liquefied gas is illustrated by way of example as being discharged from the storage tank 10 in this exemplary embodiment, liquefied gas may be discharged from a fuel tank adapted to store the liquefied gas in order to supply the liquefied gas as fuel to an engine.

According to this exemplary embodiment, the multistage compressor 20*a*, 20*b*, 20*c*, 20*d* compresses BOG discharged from the storage tank 10 through multiple stages. According to this exemplary embodiment, the multistage compressor includes four compression stage parts such that the BOG can be subjected to four stages of compression, but is not limited thereto.

When the multistage compressor is a four-stage compressor including four compression stage parts as in this exemplary embodiment, the multistage compressor includes a first compression stage part 20*a*, a second compression stage part 20*b*, a third compression stage part 20*c*, and a fourth compression stage part 20*d*, which are arranged in series to sequentially compress BOG. The BOG downstream of the first compression stage part 20*a* may have a pressure of 2 bar to 5 bar, for example, 3.5 bar, and the BOG downstream of the second compression stage part 20*b* may have a pressure of 10 bar to 15 bar, for example, 12 bar. In addition, the BOG downstream of the third compression stage part 20*c* may have a pressure of 25 bar to 35 bar, for example, 30.5 bar, and the BOG downstream of the fourth compression stage part 20*d* may have a pressure of 75 bar to 90 bar, for example, 83.5 bar.

The multistage compressor may include a plurality of cooling stage parts 21*a*, 21*b*, 21*c*, 21*d* disposed downstream of the compression stage parts 20*a*, 20*b*, 20*c*, 20*d*, respectively, to decrease the temperature of the BOG, which is increased not only in pressure but also in temperature after passing through each of the compression stage parts 20*a*, 20*b*, 20*c*, 20*d*.

According to this exemplary embodiment, the heat exchanger 30 cools the BOG (hereinafter referred to as "Flow a") compressed by the multistage compressor 20*a*, 20*b*, 20*c*, 20*d* through heat exchange between the BOG (Flow a) and the BOG discharged from the storage tank 10. That is, the BOG compressed to a higher pressure by the multistage compressor 20*a*, 20*b*, 20*c*, 20*d* is decreased in temperature by the heat exchanger 30 using the BOG discharged from the storage tank 10 as a refrigerant.

According to this exemplary embodiment, the first expansion unit 71 is disposed on a line branched off from a line through which the BOG is supplied from the heat exchanger 30 to the first intermediate cooler 41, and expands some BOG (hereinafter referred to as "Flow a1") branched off from the BOG compressed by the multistage compressor 20*a*, 20*b*, 20*c*, 20*d* and having passed through the heat exchanger 30. The first expansion unit 71 may be an expansion valve or an expander.

Some BOG (Flow a1) branched off from the BOG compressed by the multistage compressor 20*a*, 20*b*, 20*c*, 20*d* and having passed through the heat exchanger 30 is expanded to a lower pressure and temperature by the first expansion unit 71. The BOG having passed through the first expansion unit 71 is supplied to the first intermediate cooler 41 to be used as a refrigerant for decreasing the temperature of the other BOG (hereinafter referred to as "Flow a2") compressed by the multistage compressor 20*a*, 20*b*, 20*c*, 20*d* and having passed through the heat exchanger 30.

According to this exemplary embodiment, the first intermediate cooler 41 decreases the temperature of the BOG (Flow a2) having passed through the multistage compressor 20*a*, 20*b*, 20*c*, 20*d* and the heat exchanger 30 through heat exchange between some of the BOG (Flow a2) compressed by the multistage compressor 20*a*, 20*b*, 20*c*, 20*d* and having passed through the heat exchanger 30 and the BOG (Flow a1) expanded by the first expansion unit 71.

The BOG (Flow a2) cooled by the first intermediate cooler 41 after passing through the multistage compressor 20*a*, 20*b*, 20*c*, 20*d* and the heat exchanger 30 is supplied to the second expansion unit 72 and the second intermediate cooler 42, and the BOG (Flow a1) supplied to the first intermediate cooler 41 through the first expansion unit 71 is supplied downstream of one compression stage part 20*b* of the multistage compressor 20*a*, 20*b*, 20*c*, 20*d*.

According to this exemplary embodiment, the second expansion unit 72 is disposed on a line branched off from a line through which the BOG is supplied from the first intermediate cooler 41 to the second intermediate cooler 42, and expands some of the BOG (Flow a21) cooled while passing through the heat exchanger 30 and the first intermediate cooler 41. The second expansion unit 72 may be an expansion valve or an expander.

Among the BOG (Flow a2) cooled while passing through the heat exchanger 30 and the first intermediate cooler 41, some BOG (Flow a21) is expanded to a lower pressure and temperature by the second expansion unit 72. The BOG (Flow a21) having passed through the second expansion unit 72 is supplied to the second intermediate cooler 42 to be used as a refrigerant for decreasing the temperature of the other BOG (Flow a22) cooled while passing through the heat exchanger 30 and the first intermediate cooler 41.

According to this exemplary embodiment, the second intermediate cooler 42 further decreases the temperature of the BOG (Flow a22), which is cooled while passing through the heat exchanger 30 and the first intermediate cooler 41, through heat exchange between the BOG (Flow a22) and the BOG (Flow a21) expanded by the second expansion unit 72.

The BOG cooled by the heat exchanger 30, the first intermediate cooler 41 and the second intermediate cooler 42 is supplied to the gas/liquid separator 60 through the third expansion unit 73, and the BOG supplied to the second intermediate cooler 42 through the second expansion unit 72 is supplied downstream of one of the compression stage part 20*a*, 20*b*, 20*c*, 20*d* in the multistage compressor.

The first intermediate cooler 41 is adapted to decrease the temperature of the BOG primarily cooled by the heat exchanger 30 using the BOG discharged from the storage tank 10, whereas the second intermediate cooler 42 is adapted to decrease the temperature of the BOG primarily cooled by the heat exchanger 30 and then secondarily cooled by the first intermediate cooler 41. Thus, the BOG (Flow a21) supplied as a refrigerant to the second intermediate cooler 42 is required to have a lower temperature than the BOG (Flow a1) supplied as a refrigerant to the first intermediate cooler 41. That is, the BOG having passed through the second expansion unit 72 is expanded more than the BOG having passed through the first expansion unit 71 and thus has a lower pressure than the BOG having passed through the first expansion unit 71. Accordingly, the BOG discharged from the first intermediate cooler 41 is supplied to a compression stage part disposed farther downstream than a compression stage part to which the BOG discharged from the second intermediate cooler 42 is supplied. The BOG discharged from the first and second intermediate coolers 41, 42 is merged with BOG having a similar pressure thereto among BOG subjected to multiple stages of compression through the multistage compressor 20*a*, 20*b*, 20*c*, 20*d*, and is then compressed.

On the other hand, since the BOG expanded by the first expansion unit 71 and the second expansion unit 72 is used as a refrigerant for cooling the BOG in the first intermediate cooler 41 and the second intermediate cooler 42, the amounts of the BOG to be supplied to the first expansion unit 71 and the second expansion unit 72 may be adjusted depending upon the degree of cooling the BOG in the first intermediate cooler 41 and the second intermediate cooler 42. Here, the BOG compressed by the multistage compressor 20*a*, 20*b*, 20*c*, 20*d* and having passed through the heat exchanger 30 is divided into two flows to be supplied to the first expansion unit 71 and the first intermediate cooler 41, respectively. Thus, the ratio of BOG to be supplied to the first expansion unit 71 is increased in order to cool the BOG to a lower temperature in the first intermediate cooler 41 and is decreased in order to cool a smaller amount of BOG in the first intermediate cooler 41.

Like the BOG supplied from the heat exchanger 30 to the first intermediate cooler 41, when the BOG is supplied from the first intermediate cooler 41 to the second intermediate cooler 42, the ratio of BOG to be supplied to the second expansion unit 72 is increased in order to cool the BOG to a lower temperature in the second intermediate cooler 42 and the ratio of BOG to be supplied to the second expansion unit 72 is decreased in order to cool a smaller amount of BOG in the second intermediate cooler 42.

In this exemplary embodiment, the reliquefaction apparatus includes two intermediate coolers 41, 42 and two expansion units 71, 72 disposed upstream of the intermediate coolers 41, 42, respectively. However, it should be noted that the number of intermediate coolers and the number of expansion units disposed upstream of the intermediate coolers can be changed, as needed. In addition, the intermediate coolers 41, 42 according to this exemplary embodiment may be intermediate coolers for ships, as shown in FIG. 1, or may be typical heat exchangers.

According to this exemplary embodiment, the third expansion unit 73 expands the BOG having passed through the first intermediate cooler 41 and the second intermediate cooler 42 to about normal pressure.

According to this exemplary embodiment, the gas/liquid separator 60 separates the BOG, which has been subjected to partial reliquefaction while passing through the third expansion unit 73, into reliquefied BOG and gaseous BOG. The gaseous BOG separated by the gas/liquid separator 60 is supplied upstream of the heat exchanger 30 to be subjected to reliquefaction together with the BOG discharged from the storage tank 10, and the reliquefied BOG separated by the gas/liquid separator 60 is returned back to the storage tank 10. In an exemplary embodiment wherein BOG is discharged from a fuel tank, the reliquefied BOG is supplied to the fuel tank.

Hereinafter, the flow of BOG in the BOG reliquefaction apparatus for ships according to this exemplary embodiment will be described with reference to FIG. 1.

BOG discharged from the storage tank 10 passes through the heat exchanger 30 and is then compressed by the multistage compressor 20*a*, 20*b*, 20*c*, 20*d*. The BOG compressed by the multistage compressor 20*a*, 20*b*, 20*c*, 20*d* has a pressure of about 40 bar to 100 bar, or about 80 bar. The BOG compressed by the multistage compressor 20*a*, 20*b*, 20*c*, 20*d* has a supercritical fluid phase in which liquid and gas are not distinguished from each other.

The BOG having passed through the multistage compressor 20*a*, 20*b*, 20*c*, 20*d* is kept in a supercritical fluid phase with a substantially similar pressure before the third expansion unit 73 while passing through the heat exchanger 30, the first intermediate cooler 41 and the second intermediate cooler 42. Since the BOG having passed through the multistage compressor 20*a*, 20*b*, 20*c*, 20*d* can undergo sequential decrease in temperature while passing through the heat exchanger 30, the first intermediate cooler 41 and the second intermediate cooler 42, and can undergo sequential decrease in pressure depending upon an application method of processes while passing through the heat exchanger 30, the first intermediate cooler 41 and the second intermediate cooler 42, the BOG may be in a gas/liquid mixed phase or in a liquid phase before the third expansion unit 73 while passing through the heat exchanger 30, the first intermediate cooler 41 and the second intermediate cooler 42.

The BOG having passed through the multistage compressor 20*a*, 20*b*, 20*c*, 20*d* is supplied again to the heat exchanger 30 to be subjected to heat exchange with the BOG discharged from the storage tank 10. The BOG having passed through the multistage compressor 20*a*, 20*b*, 20*c*, 20*d* and the heat exchanger 30 may have a temperature of about −10° C. to 35° C.

Among the BOG (Flow a) having passed through multistage compressor 20*a*, 20*b*, 20*c*, 20*d* and the heat exchanger 30, some BOG (Flow a1) is supplied to the first expansion unit 71 and the other BOG (Flow a2) is supplied to the first intermediate cooler 41. The BOG (Flow a1) supplied to the first expansion unit 71 is expanded to a lower pressure and temperature and is then supplied to the first intermediate cooler 41, and the other BOG (Flow a2) supplied to the first intermediate cooler 41 through the heat exchanger 30 is decreased in temperature through heat exchange with the BOG having passed through the first expansion unit 71.

The BOG (Flow a1) branched off from the BOG having passed through the heat exchanger 30 and supplied to the first expansion unit 71 is expanded to a gas/liquid mixed phase by the first expansion unit 71. The BOG expanded to the gas/liquid mixed phase by the first expansion unit 71 is converted into a gas phase through heat exchange in the first intermediate cooler 41.

Among the BOG (Flow a2) obtained in the first intermediate cooler 41 through heat exchange with the BOG having passed through the first expansion unit 71, some BOG (Flow a21) is supplied to the second expansion unit 72 and the other BOG (Flow a22) is supplied to the second intermediate cooler 42. The BOG (Flow a21) supplied to the second expansion unit 72 is expanded to a lower pressure and temperature and is then supplied to the second intermediate cooler 42, and the BOG supplied to the second intermediate cooler 42 through the first intermediate cooler 41 is subjected to heat exchange with the BOG having passed through the second expansion unit 72 to have a lower temperature.

Like the BOG (Flow a1) supplied to the first expansion unit 71 through the heat exchanger 30, the BOG (Flow a21) supplied to the second expansion unit 72 through the first intermediate cooler 41 may be expanded to a gas/liquid mixed phase by the second expansion unit 72. The BOG expanded to the gas/liquid mixed phase by the second expansion unit 72 is converted into a gas phase through heat exchange in the second intermediate cooler 42.

The BOG (Flow a22) subjected to heat exchange with the BOG having passed through the second expansion unit 72 in the second intermediate cooler 42 is partially reliquefied through expansion to about normal pressure and a lower temperature by the third expansion unit 73. The BOG having passed through the third expansion unit 73 is supplied to the gas/liquid separator 60, in which the BOG is separated into reliquefied BOG and gaseous BOG. The reliquefied BOG is supplied to the storage tank 10 and the gaseous BOG is supplied upstream of the heat exchanger 30.

The BOG reliquefaction apparatus for ships according to this exemplary embodiment cools the BOG through self-heat exchange using the BOG (Flow a1) expanded by the first expansion unit 71 and the BOG (Flow a21) expanded by the second expansion unit 72 as a refrigerant, thereby enabling reliquefaction of the BOG without a separate refrigerant cycle.

In addition, a conventional reliquefaction apparatus having a separate refrigerant cycle consumes a power of about 2.4 kW in order to recover a heat quantity of 1 kW, whereas the BOG reliquefaction apparatus for ships according to the exemplary embodiments consumes a power of about 1.7 kW in order to recover a heat quantity of 1 kW, thereby reducing energy consumption for operation of the reliquefaction apparatus.

Figure 2:
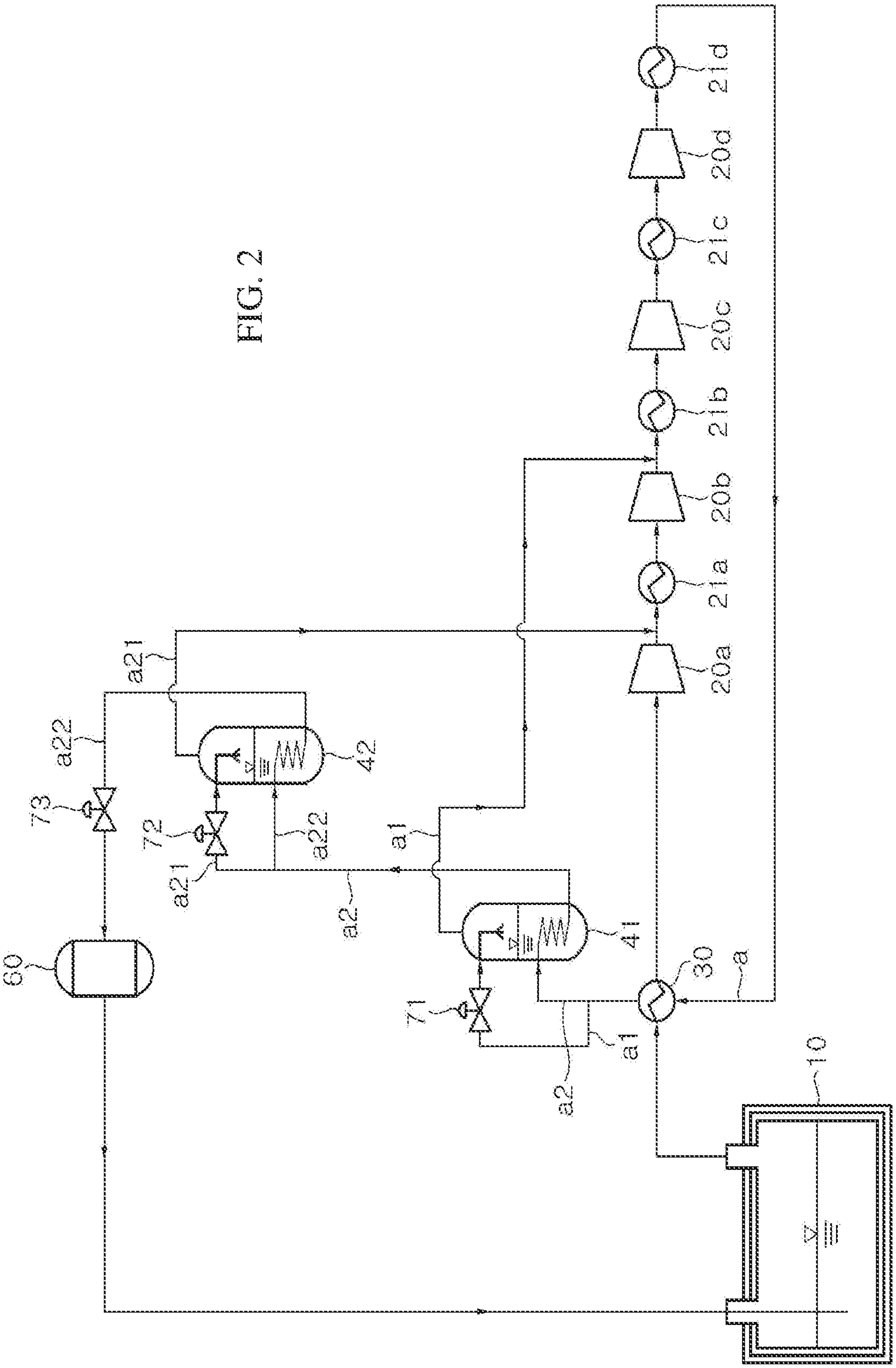
FIG. 2 is a schematic diagram of a BOG reliquefaction apparatus for ships according to a second exemplary embodiment of the present invention.

FIG. 2 is a schematic diagram of a BOG reliquefaction apparatus for ships according to a second exemplary embodiment of the present invention.

The BOG reliquefaction apparatus for ships according to the second exemplary embodiment shown in FIG. 2 is distinguished from the BOG reliquefaction apparatus for ships according to the first exemplary embodiment shown in FIG. 1 in that reliquefied BOG separated by the gas/liquid separator is supplied together with gaseous BOG to the storage tank, and the following description will focus on the different features of the second exemplary embodiment. Detailed description of the same components as those of the BOG reliquefaction apparatus for ships according to the first exemplary embodiment will be omitted.

Referring to FIG. 2, like the first exemplary embodiment, the BOG reliquefaction apparatus for ships according to the second exemplary embodiment includes: a multistage compressor 20*a*, 20*b*, 20*c*, 20*d*; a heat exchanger 30; a first expansion unit 71; a first intermediate cooler 41; a second expansion unit 72; a second intermediate cooler 42; a third expansion unit 73; and a gas/liquid separator 60.

As in the first exemplary embodiment, the storage tank 10 according to this exemplary embodiment stores liquefied gas, such as ethane, ethylene, and the like, and discharges BOG, which is generated through vaporization of the liquefied gas by heat transferred from the outside, when the internal pressure of the storage tank 10 exceeds a predetermined pressure.

As in the first exemplary embodiment, the multistage compressor 20*a*, 20*b*, 20*c*, 20*d* according to this exemplary embodiment compresses BOG discharged from the storage tank 10 through multiple stages. A plurality of coolers 21*a*, 21*b*, 21*c*, 21*d* may be disposed downstream of a plurality of compression stage parts 20*a*, 20*b*, 20*c*, 20*d*, respectively.

As in the first exemplary embodiment, the heat exchanger 30 according to this exemplary embodiment performs heat exchange between the BOG compressed by the multistage compressor 20*a*, 20*b*, 20*c*, 20*d* and the BOG discharged from the storage tank 10.

As in the first exemplary embodiment, the first expansion unit 71 according to this exemplary embodiment is disposed on a line branched off from a line through which the BOG is supplied from the heat exchanger 30 to the first intermediate cooler 41, and expands some of the BOG compressed by the multistage compressor 20*a*, 20*b*, 20*c*, 20*d* and having passed through the heat exchanger 30.

As in the first exemplary embodiment, the first intermediate cooler 41 according to this exemplary embodiment decreases the temperature of the BOG having passed through the multistage compressor 20*a*, 20*b*, 20*c*, 20*d* and the heat exchanger 30 through heat exchange between some of the BOG compressed by the multistage compressor 20*a*, 20*b*, 20*c*, 20*d* and having passed through the heat exchanger 30 and the BOG expanded by the first expansion unit 71.

As in the first exemplary embodiment, the second expansion unit 72 according to this exemplary embodiment is disposed on a line branched off from a line through which the BOG is supplied from the first intermediate cooler 41 to the second intermediate cooler 42, and expands some of the BOG cooled while passing through the heat exchanger 30 and the first intermediate cooler 41.

As in the first exemplary embodiment, the second intermediate cooler 42 according to this exemplary embodiment further decreases the temperature of the BOG, which is cooled while passing through the heat exchanger 30 and the first intermediate cooler 41, through heat exchange between the BOG cooled while passing through the heat exchanger 30 and the first intermediate cooler 41 and the BOG expanded by the second expansion unit 72.

As in the first exemplary embodiment, the BOG discharged from the first intermediate cooler 41 is supplied farther downstream of the compression stage part than the BOG discharged from the second intermediate cooler 42.

In addition, as in the first exemplary embodiment, the ratio of BOG to be supplied to the first expansion unit 71 is increased in order to cool the BOG to a lower temperature in the first intermediate cooler 41 and is decreased in order to cool a smaller amount of BOG in the first intermediate cooler 41.

Like the BOG supplied from the heat exchanger 30 to the first intermediate cooler 41, when the BOG is supplied from the first intermediate cooler 41 to the second intermediate cooler 42, the ratio of BOG to be supplied to the second expansion unit 72 is increased in order to cool the BOG to a lower temperature in the second intermediate cooler 42 and the ratio of BOG to be supplied to the second expansion unit 72 is decreased in order to cool a smaller amount of BOG in the second intermediate cooler 42.

As in the first exemplary embodiment, the third expansion unit 73 according to this exemplary embodiment expands the BOG having passed through the first intermediate cooler 41 and the second intermediate cooler 42 to about normal pressure.

As in the first exemplary embodiment, the gas/liquid separator 60 according to this exemplary embodiment separates the BOG, which has been subjected to partial reliquefaction while passing through the third expansion unit 73, into reliquefied BOG and gaseous BOG.

However, unlike the first exemplary embodiment, the gaseous BOG separated by the gas/liquid separator 60 according to this exemplary embodiment is supplied together with the reliquefied BOG to the storage tank 10. The gaseous BOG supplied to the storage tank 10 is supplied together with the BOG discharged from the storage tank 10 to the heat exchanger 30 and is subjected to the reliquefaction process.

Hereinafter, the flow of BOG in the BOG reliquefaction apparatus for ships according to this exemplary embodiment will be described with reference to FIG. 2.

As in the first exemplary embodiment, the BOG discharged from the storage tank 10 passes through the heat exchanger 30 and is then compressed by the multistage compressor 20*a*, 20*b*, 20*c*, 20*d*.

As in the first exemplary embodiment, the compressed BOG having passed through the multistage compressor 20*a*, 20*b*, 20*c*, 20*d* is supplied again to the heat exchanger 30 to be subjected to heat exchange with the BOG discharged from the storage tank 10. Among the BOG having passed through the multistage compressor 20*a*, 20*b*, 20*c*, 20*d* and the heat exchanger 30, some BOG is supplied to the first expansion unit 71 and the other BOG is supplied to the first intermediate cooler 41. The BOG supplied to the first expansion unit 71 is expanded to a lower pressure and temperature and is then supplied to the first intermediate cooler 41, and the other BOG supplied to the first intermediate cooler 41 through the heat exchanger 30 is decreased in temperature through heat exchange with the BOG having passed through the first expansion unit 71.

As in the first exemplary embodiment, among the BOG obtained in the first intermediate cooler 41 through heat exchange with the BOG having passed through the first expansion unit 71, some BOG is supplied to the second expansion unit 72 and the other BOG is supplied to the second intermediate cooler 42. The BOG supplied to the second expansion unit 72 is expanded to a lower pressure and temperature and is then supplied to the second intermediate cooler 42, and the BOG supplied to the second intermediate cooler 42 through the first intermediate cooler 41 is subjected to heat exchange with the BOG having passed through the second expansion unit 72 to have a lower temperature.

As in the first exemplary embodiment, the BOG subjected to heat exchange with the BOG having passed through the second expansion unit 72 in the second intermediate cooler 42 is partially reliquefied through expansion to about normal pressure and a lower temperature by the third expansion unit 73. The BOG having passed through the third expansion unit 73 is supplied to the gas/liquid separator 60, in which the BOG is separated into reliquefied BOG and gaseous BOG.

However, unlike the first exemplary embodiment, both the gaseous BOG and the reliquefied BOG separated by the gas/liquid separator 60 according to this exemplary embodiment are supplied to the storage tank 10.

Figure 3:
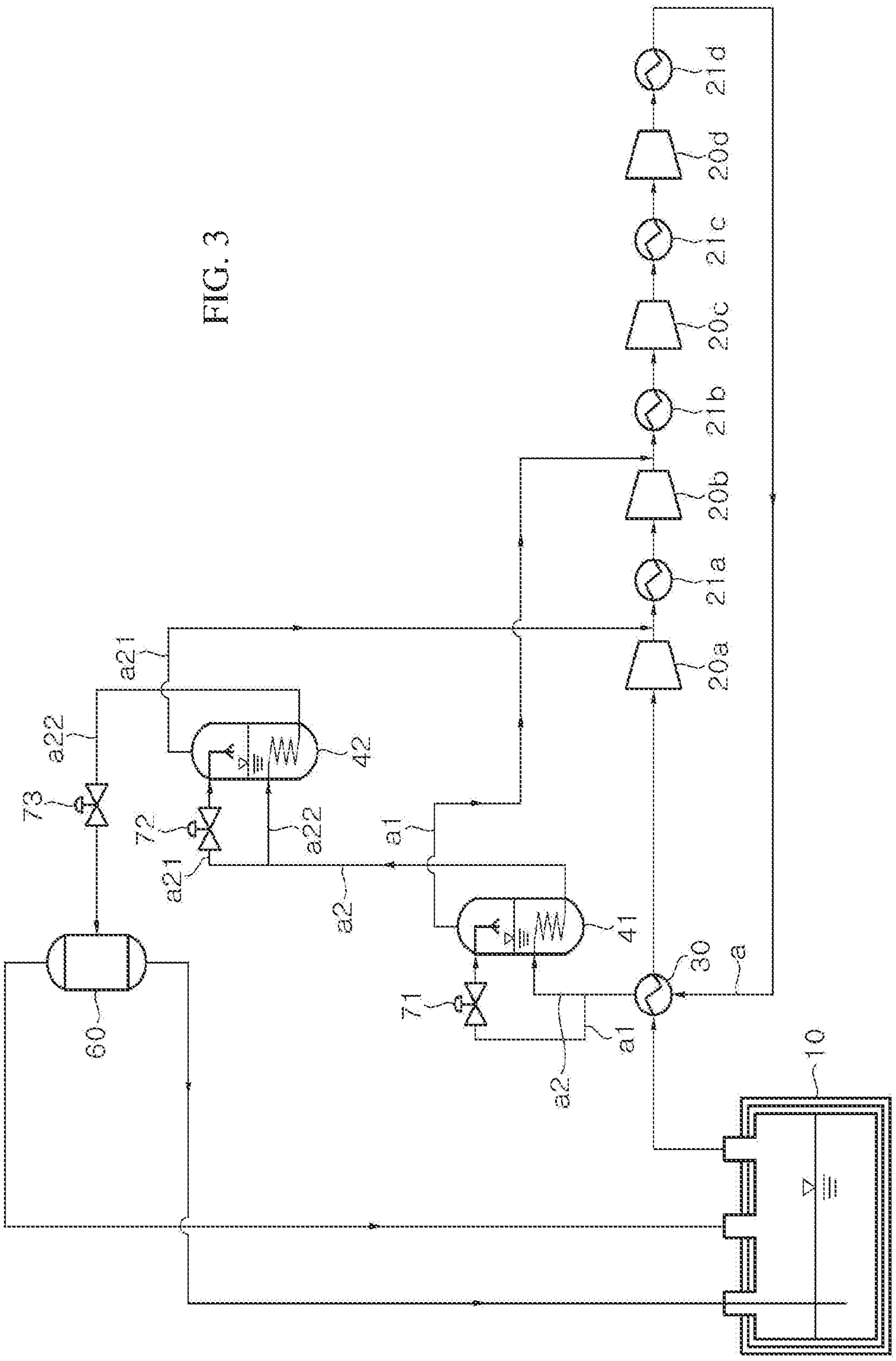
FIG. 3 is a schematic diagram of a BOG reliquefaction apparatus for ships according to a third exemplary embodiment of the present invention.

FIG. 3 is a schematic diagram of a BOG reliquefaction apparatus for ships according to a third exemplary embodiment of the present invention.

The BOG reliquefaction apparatus for ships according to the third exemplary embodiment shown in FIG. 3 is distinguished from the BOG reliquefaction apparatus for ships according to the first exemplary embodiment shown in FIG. 1 in that gaseous BOG is supplied to the storage tank, and is distinguished from the BOG reliquefaction apparatus for ships according to the second exemplary embodiment shown in FIG. 2 in that gaseous BOG is divided from reliquefied BOG and then separately supplied to storage tank. The following description will focus on the different features of the third exemplary embodiment. Detailed description of the same components as those of the BOG reliquefaction apparatus for ships according to the first and second exemplary embodiments will be omitted.

Referring to FIG. 3, as in the first and second exemplary embodiments, the BOG reliquefaction apparatus for ships according to the third exemplary embodiment includes: a multistage compressor 20*a*, 20*b*, 20*c*, 20*d*; a heat exchanger 30; the first expansion unit 71; a first intermediate cooler 41; a second expansion unit 72; a second intermediate cooler 42; a third expansion unit 73; and a gas/liquid separator 60.

As in the first and second exemplary embodiments, the storage tank 10 according to this exemplary embodiment stores liquefied gas, such as ethane, ethylene, and the like, and discharges BOG, which is generated through vaporization of the liquefied gas by heat transferred from the outside, when the internal pressure of the storage tank 10 exceeds a predetermined pressure.

As in the first and second exemplary embodiments, the multistage compressor 20*a*, 20*b*, 20*c*, 20*d* according to this exemplary embodiment compresses BOG discharged from the storage tank 10 through multiple stages. A plurality of coolers 21*a*, 21*b*, 21*c*, 21*d* may be disposed downstream of a plurality of compression stage parts 20*a*, 20*b*, 20*c*, 20*d*, respectively.

As in the first and second exemplary embodiments, the heat exchanger 30 according to this exemplary embodiment performs heat exchange between the BOG compressed by the multistage compressor 20*a*, 20*b*, 20*c*, 20*d* and the BOG discharged from the storage tank 10.

As in the first and second exemplary embodiments, the first expansion unit 71 according to this exemplary embodiment is disposed on a line branched off from a line through which the BOG is supplied from the heat exchanger 30 to the first intermediate cooler 41, and expands some of the BOG compressed by the multistage compressor 20*a*, 20*b*, 20*c*, 20*d* and having passed through the heat exchanger 30.

As in the first and second exemplary embodiments, the first intermediate cooler 41 according to this exemplary embodiment decreases the temperature of the BOG having passed through the multistage compressor 20*a*, 20*b*, 20*c*, 20*d* and the heat exchanger 30 through heat exchange between some of the BOG compressed by the multistage compressor 20*a*, 20*b*, 20*c*, 20*d* and having passed through the heat exchanger 30 and the BOG expanded by the first expansion unit 71.

As in the first and second exemplary embodiments, the second expansion unit 72 according to this exemplary embodiment is disposed on a line branched off from a line through which the BOG is supplied from the first intermediate cooler 41 to the second intermediate cooler 42, and expands some of the BOG cooled while passing through the heat exchanger 30 and the first intermediate cooler 41.

As in the first and second exemplary embodiments, the second intermediate cooler 42 according to this exemplary embodiment further decreases the temperature of the BOG, which is cooled while passing through the heat exchanger 30 and the first intermediate cooler 41, through heat exchange between the BOG cooled while passing through the heat exchanger 30 and the first intermediate cooler 41 and the BOG expanded by the second expansion unit 72.

As in the first and second exemplary embodiments, the BOG discharged from the first intermediate cooler 41 is supplied farther downstream of the compression stage part of the multistage compressor than the BOG discharged from the second intermediate cooler 42.

As in the first and second exemplary embodiments, the ratio of BOG to be supplied to the first expansion unit 71 is increased in order to cool the BOG to a lower temperature in the first intermediate cooler 41 and is decreased in order to cool a smaller amount of BOG in the first intermediate cooler 41.

Like the BOG supplied from the heat exchanger 30 to the first intermediate cooler 41, when the BOG is supplied from the first intermediate cooler 41 to the second intermediate cooler 42, the ratio of BOG to be supplied to the second expansion unit 72 is increased in order to cool the BOG to a lower temperature in the second intermediate cooler 42 and the ratio of BOG to be supplied to the second expansion unit 72 is decreased in order to cool a smaller amount of BOG in the second intermediate cooler 42.

As in the first and second exemplary embodiments, the third expansion unit 73 according to this exemplary embodiment expands the BOG having passed through the first intermediate cooler 41 and the second intermediate cooler 42 to about normal pressure.

As in the first and second exemplary embodiments, the gas/liquid separator 60 according to this exemplary embodiment separates the BOG, which has been subjected to partial reliquefaction while passing through the third expansion unit 73, into reliquefied BOG and gaseous BOG.

However, unlike the first exemplary embodiment, the gaseous BOG separated by the gas/liquid separator 60 according to this exemplary embodiment is supplied to the storage tank 10. In addition, unlike the second exemplary embodiment, the gaseous BOG separated by the gas/liquid separator 60 according to this exemplary embodiment is divided from the reliquefied BOG and is separately supplied to the storage tank 10 instead of being supplied together with the reliquefied BOG thereto.

Hereinafter, the flow of BOG in the BOG reliquefaction apparatus for ships according to this exemplary embodiment will be described with reference to FIG. 3.

As in the first and second exemplary embodiments, the BOG discharged from the storage tank 10 is compressed by the multistage compressor 20*a*, 20*b*, 20*c*, 20*d* after passing through the heat exchanger 30.

As in the first and second exemplary embodiments, the BOG having passed through the multistage compressor 20*a*, 20*b*, 20*c*, 20*d* is supplied again to the heat exchanger 30 to be subjected to heat exchange with the BOG discharged from the storage tank 10. Among the BOG having passed through multistage compressor 20*a*, 20*b*, 20*c*, 20*d* and the heat exchanger 30, some BOG is supplied to the first expansion unit 71 and the other BOG is supplied to the first intermediate cooler 41. The BOG supplied to the first expansion unit 71 is expanded to a lower pressure and temperature and is then supplied to the first intermediate cooler 41, and the other BOG supplied to the first intermediate cooler 41 through the heat exchanger 30 is decreased in temperature through heat exchange with the BOG having passed through the first expansion unit 71.

As in the first and second exemplary embodiments, among the BOG obtained in the first intermediate cooler 41 through heat exchange with the BOG having passed through the first expansion unit 71, some BOG is supplied to the second expansion unit 72 and the other BOG is supplied to the second intermediate cooler 42. The BOG supplied to the second expansion unit 72 is expanded to a lower pressure and temperature and is then supplied to the second intermediate cooler 42, and the BOG supplied to the second intermediate cooler 42 through the first intermediate cooler 41 is subjected to heat exchange with the BOG having passed through the second expansion unit 72 to have a lower temperature.

As in the first and second exemplary embodiments, the BOG subjected to heat exchange with the BOG having passed through the second expansion unit 72 in the second intermediate cooler 42 is partially reliquefied through expansion to about normal pressure and a lower temperature by the third expansion unit 73. The BOG having passed through the third expansion unit 73 is supplied to the gas/liquid separator 60, in which the BOG is separated into reliquefied BOG and gaseous BOG.

However, unlike the first exemplary embodiment, the gaseous BOG separated by the gas/liquid separator 60 according to this exemplary embodiment is supplied to the storage tank 10. In addition, unlike the second exemplary embodiment, the gaseous BOG separated by the gas/liquid separator 60 according to this exemplary embodiment is divided from the reliquefied BOG and is separately supplied to the storage tank 10 instead of being supplied together with the reliquefied BOG thereto.

Figure 4:
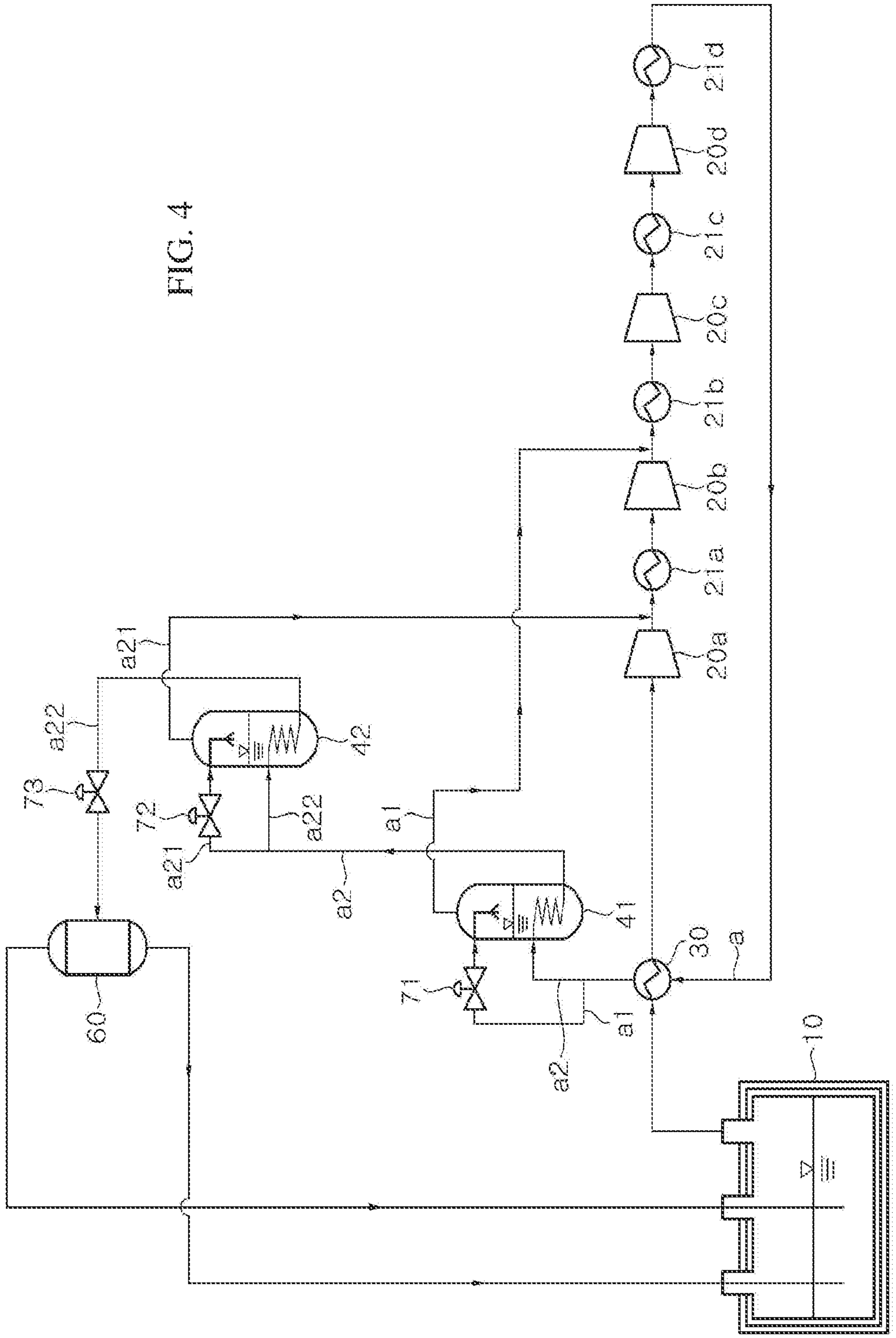
FIG. 4 is a schematic diagram of a BOG reliquefaction apparatus for ships according to a fourth exemplary embodiment of the present invention.

FIG. 4 is a schematic diagram of a BOG reliquefaction apparatus for ships according to a fourth exemplary embodiment of the present invention.

The BOG reliquefaction apparatus for ships according to the fourth exemplary embodiment shown in FIG. 4 is distinguished from the BOG reliquefaction apparatus for ships according to the first exemplary embodiment shown in FIG. 1 in that gaseous BOG is supplied to the storage tank, and is distinguished from the BOG reliquefaction apparatus for ships according to the third exemplary embodiment shown in FIG. 3 in that the gaseous BOG is supplied to a lower portion in the storage tank. The following description will focus on the different features of the fourth exemplary embodiment. Detailed description of the same components as those of the BOG reliquefaction apparatus for ships according to the first and third exemplary embodiments will be omitted.

Referring to FIG. 4, as in the first and third exemplary embodiments, the BOG reliquefaction apparatus for ships according to the fourth exemplary embodiment includes: a multistage compressor 20*a*, 20*b*, 20*c*, 20*d*; a heat exchanger 30; the first expansion unit 71; a first intermediate cooler 41; a second expansion unit 72; a second intermediate cooler 42; a third expansion unit 73; and a gas/liquid separator 60.

As in the first and third exemplary embodiments, the storage tank 10 according to this exemplary embodiment stores liquefied gas, such as ethane, ethylene, and the like, and discharges BOG, which is generated through vaporization of the liquefied gas by heat transferred from the outside, when the internal pressure of the storage tank 10 exceeds a predetermined pressure.

As in the first and third exemplary embodiments the multistage compressor 20*a*, 20*b*, 20*c*, 20*d* according to this exemplary embodiment compresses BOG discharged from the storage tank 10 through multiple stages. A plurality of coolers 21*a*, 21*b*, 21*c*, 21*d* may be disposed downstream of a plurality of compression stage parts 20*a*, 20*b*, 20*c*, 20*d*, respectively.

As in the first and third exemplary embodiments, the heat exchanger 30 according to this exemplary embodiment performs heat exchange between the BOG compressed by the multistage compressor 20*a*, 20*b*, 20*c*, 20*d* and the BOG discharged from the storage tank 10.

As in the first and third exemplary embodiments, the first expansion unit 71 according to this exemplary embodiment is disposed on a line branched off from a line through which the BOG is supplied from the heat exchanger 30 to the first intermediate cooler 41, and expands some of the BOG compressed by the multistage compressor 20*a*, 20*b*, 20*c*, 20*d* and having passed through the heat exchanger 30.

As in the first and third exemplary embodiments, the first intermediate cooler 41 according to this exemplary embodiment decreases the temperature of the BOG having passed through the multistage compressor 20*a*, 20*b*, 20*c*, 20*d* and the heat exchanger 30 through heat exchange between some of the BOG compressed by the multistage compressor 20*a*, 20*b*, 20*c*, 20*d* and having passed through the heat exchanger 30 and the BOG expanded by the first expansion unit 71.

As in the first and third exemplary embodiments, the second expansion unit 72 according to this exemplary embodiment is disposed on a line branched off from a line through which the BOG is supplied from the first intermediate cooler 41 to the second intermediate cooler 42, and expands some of the BOG cooled while passing through the heat exchanger 30 and the first intermediate cooler 41.

As in the first and third exemplary embodiments, the second intermediate cooler 42 according to this exemplary embodiment further decreases the temperature of the BOG, which is cooled while passing through the heat exchanger 30 and the first intermediate cooler 41, through heat exchange between the BOG cooled while passing through the heat exchanger 30 and the first intermediate cooler 41 and the BOG expanded by the second expansion unit 72.

As in the first and third exemplary embodiments, the BOG discharged from the first intermediate cooler 41 is supplied farther downstream of one of the compression stage part of multistage compressor than the BOG discharged from the second intermediate cooler 42.

As in the first and third exemplary embodiments, the ratio of BOG to be supplied to the first expansion unit 71 is increased in order to cool the BOG to a lower temperature in the first intermediate cooler 41 and is decreased in order to cool a smaller amount of BOG in the first intermediate cooler 41.

Like the BOG supplied from the heat exchanger 30 to the first intermediate cooler 41, when the BOG is supplied from the first intermediate cooler 41 to the second intermediate cooler 42, the ratio of BOG to be supplied to the second expansion unit 72 is increased in order to cool the BOG to a lower temperature in the second intermediate cooler 42 and the ratio of BOG to be supplied to the second expansion unit 72 is decreased in order to cool a smaller amount of BOG in the second intermediate cooler 42.

As in the first and third exemplary embodiments, the third expansion unit 73 according to this exemplary embodiment expands the BOG having passed through the first intermediate cooler 41 and the second intermediate cooler 42 to about normal pressure.

As in the first and third exemplary embodiments, the gas/liquid separator 60 according to this exemplary embodiment separates the BOG, which has been subjected to partial reliquefaction while passing through the third expansion unit 73, into reliquefied BOG and gaseous BOG.

However, unlike the first exemplary embodiment, both the gaseous BOG and the reliquefied BOG separated by the gas/liquid separator 60 according to this exemplary embodiment are supplied to the storage tank 10. In addition, unlike the third exemplary embodiment, the gaseous BOG separated by the gas/liquid separator 60 according to this exemplary embodiment is supplied to the lower portion in the storage tank 10, which is filled with liquefied natural gas, instead of being supplied to an upper portion in the storage tank 10.

When the gaseous BOG separated by the gas/liquid separator 60 is supplied to the lower portion in the storage tank 10, the gaseous BOG can be decreased in temperature or partially liquefied by the liquefied natural gas, thereby improving reliquefaction efficiency. Further, since the liquefied natural gas inside the storage tank 10 has a lower temperature at a lower level than at a higher level, it is desirable that the gaseous BOG be supplied to the lowest portion in the storage tank 10.

Hereinafter, the flow of BOG in the BOG reliquefaction apparatus for ships according to this exemplary embodiment will be described with reference to FIG. 4.

As in the first and third exemplary embodiments, the BOG discharged from the storage tank 10 is compressed by multistage compressor 20*a*, 20*b*, 20*c*, 20*d* after passing through the heat exchanger 30.

As in the first and third exemplary embodiments, the BOG having passed through the multistage compressor 20*a*, 20*b*, 20*c*, 20*d* is supplied again to the heat exchanger 30 to be subjected to heat exchange with the BOG discharged from the storage tank 10. Among the BOG having passed through multistage compressor 20*a*, 20*b*, 20*c*, 20*d* and the heat exchanger 30, some BOG is supplied to the first expansion unit 71 and the other BOG is supplied to the first intermediate cooler 41. The BOG supplied to the first expansion unit 71 is expanded to a lower temperature and pressure and is then supplied to the first intermediate cooler 41, and the other BOG supplied to the first intermediate cooler 41 through the heat exchanger 30 is decreased in temperature through heat exchange with the BOG having passed through the first expansion unit 71.

As in the first and third exemplary embodiments, among the BOG obtained in the first intermediate cooler 41 through heat exchange with the BOG having passed through the first expansion unit 71, some BOG is supplied to the second expansion unit 72 and the other BOG is supplied to the second intermediate cooler 42. The BOG supplied to the second expansion unit 72 is expanded to a lower temperature and pressure and is then supplied to the second intermediate cooler 42, and the BOG supplied to the second intermediate cooler 42 through the first intermediate cooler 41 is subjected to heat exchange with the BOG having passed through the second expansion unit 72 to have a lower temperature.

As in the first and third exemplary embodiments, the BOG subjected to heat exchange with the BOG having passed through the second expansion unit 72 in the second intermediate cooler 42 is partially reliquefied through expansion to about normal pressure and a lower temperature by the third expansion unit 73. The BOG having passed through the third expansion unit 73 is supplied to the gas/liquid separator 60, in which the BOG is separated into reliquefied BOG and gaseous BOG.

However, unlike the first exemplary embodiment, both the gaseous BOG and the reliquefied BOG separated by the gas/liquid separator 60 according to this exemplary embodiment are supplied to the storage tank 10. In addition, unlike the third exemplary embodiment, the gaseous BOG separated by the gas/liquid separator 60 according to this exemplary embodiment is supplied to the lower portion in the storage tank 10, which is filled with liquefied natural gas, instead of being supplied to an upper portion in the storage tank 10.

Figure 5:
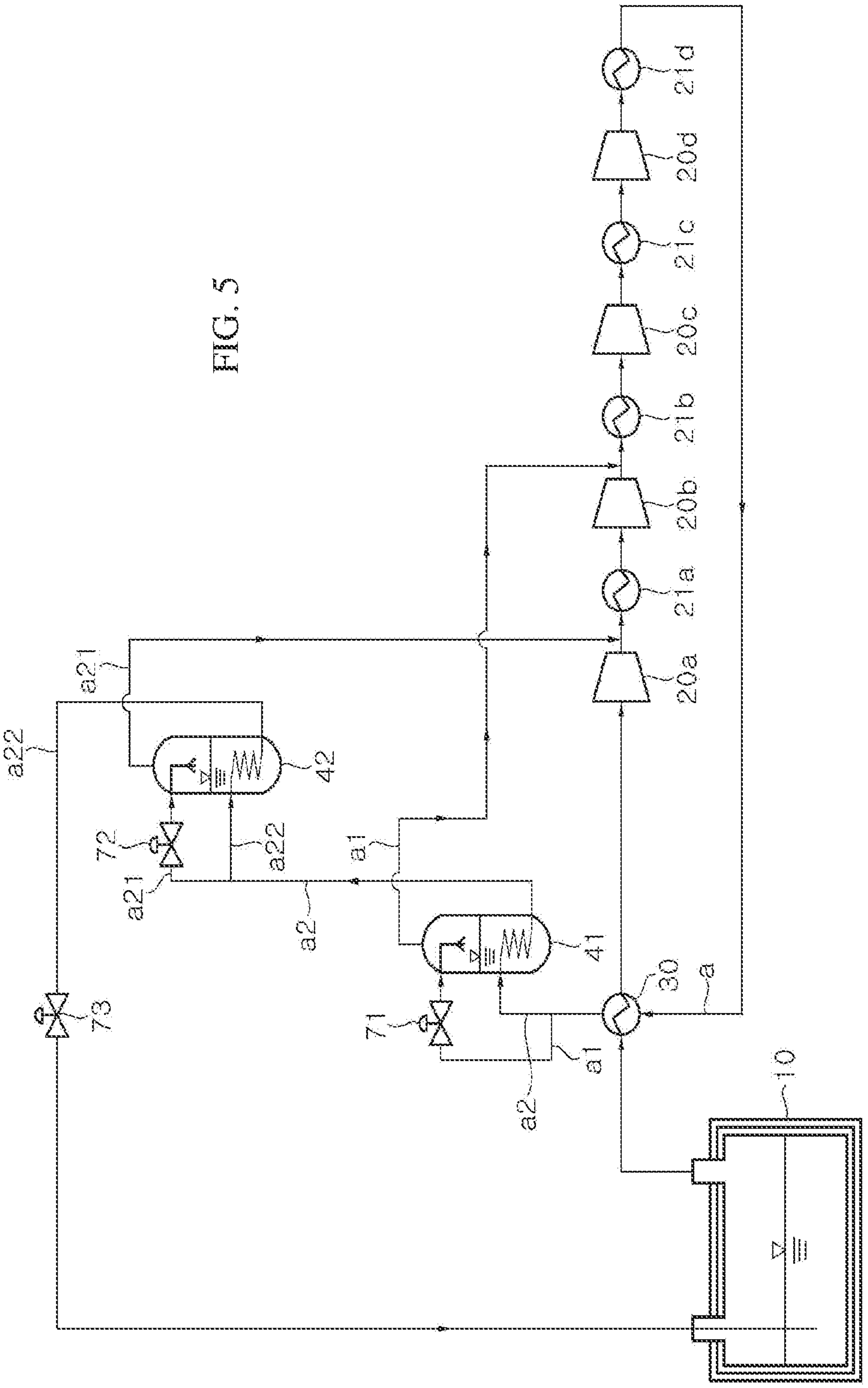
FIG. 5 is a schematic diagram of a BOG reliquefaction apparatus for ships according to a fifth exemplary embodiment of the present invention.

FIG. 5 is a schematic diagram of a BOG reliquefaction apparatus for ships according to a fifth exemplary embodiment of the present invention.

The BOG reliquefaction apparatus for ships according to the fifth exemplary embodiment shown in FIG. 5 is distinguished from the BOG reliquefaction apparatus for ships according to the first exemplary embodiment shown in FIG. 1 in that the BOG reliquefaction apparatus for ships according to the fifth exemplary embodiment does not include the gas/liquid separator. The following description will focus on the different features of the fifth exemplary embodiment. Detailed description of the same components as those of the BOG reliquefaction apparatus for ships according to the first exemplary embodiment will be omitted.

Referring to FIG. 5, as in the first exemplary embodiment, the BOG reliquefaction apparatus for ships according to this exemplary embodiment includes: a multistage compressor 20*a*, 20*b*, 20*c*, 20*d*; a heat exchanger 30; the first expansion unit 71; a first intermediate cooler 41; a second expansion unit 72; a second intermediate cooler 42; and a third expansion unit 73. Here, the BOG reliquefaction apparatus for ships according to this exemplary embodiment does not include the gas/liquid separator 60.

As in the first exemplary embodiment, the storage tank 10 according to this exemplary embodiment stores liquefied gas, such as ethane, ethylene, and the like, and discharges BOG, which is generated through vaporization of the liquefied gas by heat transferred from the outside, when the internal pressure of the storage tank 10 exceeds a predetermined pressure.

As in the first exemplary embodiment, the multistage compressor 20*a*, 20*b*, 20*c*, 20*d* according to this exemplary embodiment compresses BOG discharged from the storage tank 10 through multiple stages. A plurality of coolers 21*a*, 21*b*, 21*c*, 21*d* may be disposed downstream of a plurality of compression stage parts 20*a*, 20*b*, 20*c*, 20*d*, respectively.

As in the first exemplary embodiment, the heat exchanger 30 according to this exemplary embodiment performs heat exchange between the BOG compressed by the multistage compressor 20*a*, 20*b*, 20*c*, 20*d* and the BOG discharged from the storage tank 10.

As in the first exemplary embodiment, the first expansion unit 71 according to this exemplary embodiment is disposed on a line branched off from a line through which the BOG is supplied from the heat exchanger 30 to the first intermediate cooler 41, and expands some of the BOG compressed by the multistage compressor 20*a*, 20*b*, 20*c*, 20*d* and having passed through the heat exchanger 30.

As in the first exemplary embodiment, the first intermediate cooler 41 according to this exemplary embodiment decreases the temperature of the BOG having passed through the multistage compressor 20*a*, 20*b*, 20*c*, 20*d* and the heat exchanger 30 through heat exchange between some of the BOG compressed by the multistage compressor 20*a*, 20*b*, 20*c*, 20*d* and having passed through the heat exchanger 30 and the BOG expanded by the first expansion unit 71.

As in the first exemplary embodiment, the second expansion unit 72 according to this exemplary embodiment is disposed on a line branched off from a line through which the BOG is supplied from the first intermediate cooler 41 to the second intermediate cooler 42, and expands some of the BOG cooled while passing through the heat exchanger 30 and the first intermediate cooler 41.

As in the first exemplary embodiment, the second intermediate cooler 42 according to this exemplary embodiment further decreases the temperature of the BOG, which is cooled while passing through the heat exchanger 30 and the first intermediate cooler 41, through heat exchange between the BOG cooled while passing through the heat exchanger 30 and the first intermediate cooler 41 and the BOG expanded by the second expansion unit 72.

As in the first exemplary embodiment, the BOG discharged from the first intermediate cooler 41 is supplied farther downstream of the multistage compressor than the BOG discharged from the second intermediate cooler 42.

In addition, as in the first exemplary embodiment, the ratio of BOG to be supplied to the first expansion unit 71 is increased in order to cool the BOG to a lower temperature in the first intermediate cooler 41 and is decreased in order to cool a smaller amount of BOG in the first intermediate cooler 41.

Like the BOG supplied from the heat exchanger 30 to the first intermediate cooler 41, when the BOG is supplied from the first intermediate cooler 41 to the second intermediate cooler 42, the ratio of BOG to be supplied to the second expansion unit 72 is increased in order to cool the BOG to a lower temperature in the second intermediate cooler 42 and the ratio of BOG to be supplied to the second expansion unit 72 is decreased in order to cool a smaller amount of BOG in the second intermediate cooler 42.

As in the first exemplary embodiment, the third expansion unit 73 according to this exemplary embodiment expands the BOG having passed through the first intermediate cooler 41 and the second intermediate cooler 42 to about normal pressure.

According to this exemplary embodiment, since the BOG reliquefaction apparatus for ships does not include the gas/liquid separator 60, both the gaseous BOG and the reliquefied BOG having passed through the third expansion unit 73 are supplied in a mixed phase to the storage tank 10.

As in the second to fifth exemplary embodiments described above, when gaseous BOG is supplied to the storage tank instead of being supplied upstream of the heat exchanger 30, advantageously, the BOG can be efficiently discharged from the storage tank 10 even without a separate pump, if the storage tank 10 is a compression tank.

Hereinafter, the flow of BOG in the BOG reliquefaction apparatus for ships according to this exemplary embodiment will be described with reference to FIG. 5.

As in the first exemplary embodiment, the BOG discharged from the storage tank 10 passes through the heat exchanger 30 and is then compressed by the multistage compressor 20*a*, 20*b*, 20*c*, 20*d*.

As in the first exemplary embodiment, the BOG having passed through the multistage compressor 20*a*, 20*b*, 20*c*, 20*d* is supplied again to the heat exchanger 30 to be subjected to heat exchange with the BOG discharged from the storage tank 10. Among the BOG having passed through the multistage compressor 20*a*, 20*b*, 20*c*, 20*d* and the heat exchanger 30, some BOG is supplied to the first expansion unit 71 and the other BOG is supplied to the first intermediate cooler 41. The BOG supplied to the first expansion unit 71 is expanded to a lower pressure and temperature and is then supplied to the first intermediate cooler 41, and the other BOG supplied to the first intermediate cooler 41 through the heat exchanger 30 is decreased in temperature through heat exchange with the BOG having passed through the first expansion unit 71.

As in the first exemplary embodiment, among the BOG obtained in the first intermediate cooler 41 through heat exchange with the BOG having passed through the first expansion unit 71, some BOG is supplied to the second expansion unit 72 and the other BOG is supplied to the second intermediate cooler 42. The BOG supplied to the second expansion unit 72 is expanded to a lower temperature and pressure and is then supplied to the second intermediate cooler 42, and the BOG supplied to the second intermediate cooler 42 through the first intermediate cooler 41 is subjected to heat exchange with the BOG having passed through the second expansion unit 72 to have a lower temperature.

As in the first exemplary embodiment, the BOG subjected to heat exchange with the BOG having passed through the second expansion unit 72 in the second intermediate cooler 42 is partially reliquefied through expansion to about normal pressure and a lower temperature by the third expansion unit 73. Here, unlike the first exemplary embodiment, the BOG having passed through the third expansion unit 73 is supplied in a gas/liquid phase to the storage tank 10.

Figure 6:
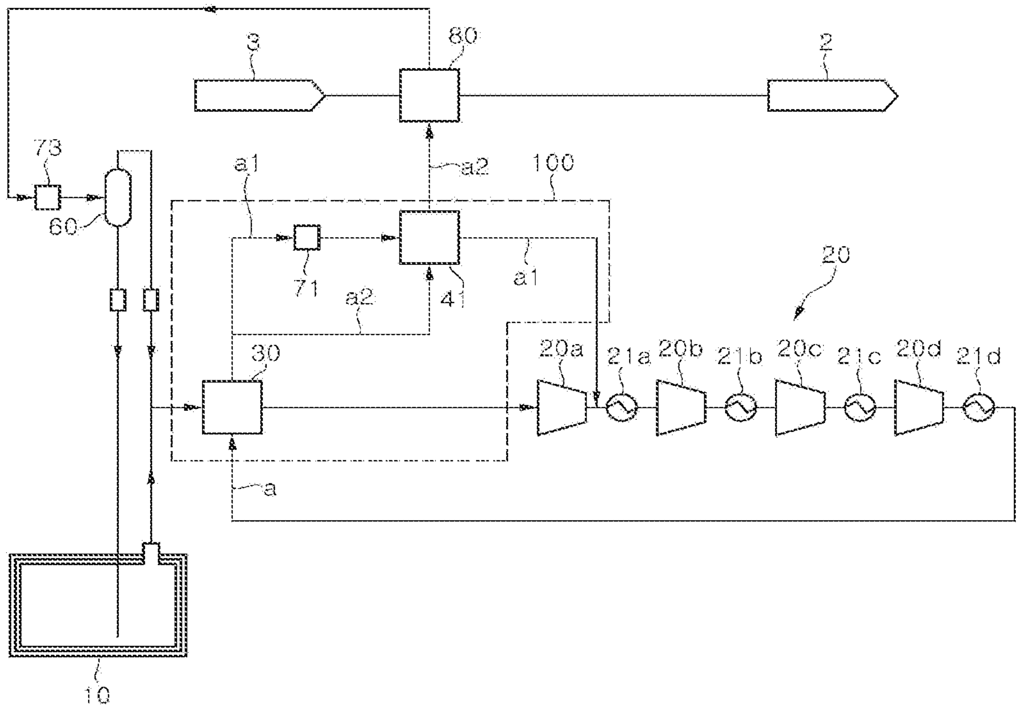
FIG. 6 is a schematic diagram of a BOG reliquefaction apparatus for ships according to a sixth exemplary embodiment of the present invention.

FIG. 6 is a schematic diagram of a BOG reliquefaction apparatus for ships according to a sixth exemplary embodiment of the present invention. Detailed description of the same components as those of the BOG reliquefaction apparatus for ships according to the first exemplary embodiment will be omitted.

Referring to FIG. 6, a BOG reliquefaction apparatus for ships according to this exemplary embodiment includes: a storage tank 10 storing liquefied gas; a multistage compressor 20 including a plurality of compression stage parts 20*a*, 20*b*, 20*c*, 20*d* and compressing BOG discharged from the storage tank 10 through multiple stages; a heat exchange unit 100 disposed between the storage tank 10 and the multistage compressor 20 to cool the BOG compressed by the multistage compressor 20; a third expansion unit 73 disposed downstream of the heat exchange unit 100 and expanding some of the BOG having passed through the heat exchange unit 100; and a gas/liquid separator 60 separating the BOG, which has been subjected to partial reliquefaction while passing through the third expansion unit 73, into reliquefied BOG and gaseous BOG.

A line to which the storage tank 10, the multistage compressor 20, the heat exchange unit 100, the third expansion unit 73, and the gas/liquid separator 60 are provided will be referred to as a “reliquefaction line”, and provide a path through which the BOG discharged from the storage tank 10 is reliquefied and returned in a liquid phase to the storage tank 10.

According to this exemplary embodiment, the storage tank 10 stores liquefied gas, such as ethane, ethylene, and the like, and discharges BOG, which is generated through vaporization of the liquefied gas by heat transferred from the outside, when the internal pressure of the storage tank 10 exceeds a predetermined pressure.

According to this exemplary embodiment, the multistage compressor 20*a*, 20*b*, 20*c*, 20*d* compresses BOG discharged from the storage tank 10 through multiple stages. According to this exemplary embodiment, the multistage compressor includes four compression stage parts such that the BOG can be subjected to four stages of compression, but is not limited thereto.

When the multistage compressor is a four-stage compressor including four compression stage parts, the multistage compressor includes a first compression stage part 20*a*, a second compression stage part 20*b*, a third compression stage part 20*c*, and a fourth compression stage part 20*d*, which are arranged in series to sequentially compress BOG. The BOG downstream of the first compression stage part 20*a* may have a pressure of 2 bar to 5 bar, for example, 3.5 bar, and the BOG downstream of the second compression stage part 20*b* may have a pressure of 10 bar to 15 bar, for example, 12 bar. In addition, the BOG downstream of the third compression stage part 20*c* may have a pressure of 25 bar to 35 bar, for example, 30.5 bar, and the BOG downstream of the fourth compression stage part 20*d* may have a pressure of 75 bar to 90 bar, for example, 83.5 bar.

The BOG reliquefaction apparatus may include a plurality of coolers 21*a*, 21*b*, 21*c*, 21*d* disposed downstream of the plurality of compression stage parts 20*a*, 20*b*, 20*c*, 20*d*, respectively, to decrease the temperature of the BOG, which is increased not only in pressure but also in temperature after passing through each of the compression stage parts 20*a*, 20*b*, 20*c*, 20*d*.

According to this exemplary embodiment, the heat exchange unit 100 includes: a heat exchanger 30 cooling the BOG (hereinafter referred to as "Flow a") compressed by the multistage compressor 20*a*, 20*b*, 20*c*, 20*d* through heat exchange between the BOG compressed by the multistage compressor 20*a*, 20*b*, 20*c*, 20*d* and the BOG discharged from the storage tank 10; a first expansion unit 71 expanding the BOG compressed by the multistage compressor 20*a*, 20*b*, 20*c*, 20*d* and having passed through the heat exchanger 30; and a first intermediate cooler 41 decreasing the temperature of BOG compressed by the multistage compressor 20*a*, 20*b*, 20*c*, 20*d* and having passed through the heat exchanger 30.

According to this exemplary embodiment, the heat exchanger 30 performs heat exchange between the BOG (Flow a) compressed by the multistage compressor 20*a*, 20*b*, 20*c*, 20*d* and the BOG discharged from the storage tank 10. That is, the BOG (Flow a) compressed to a higher pressure by the multistage compressor 20*a*, 20*b*, 20*c*, 20*d* is decreased in temperature by the heat exchanger 30 using the BOG discharged from the storage tank 10 as a refrigerant.

According to this exemplary embodiment, the first expansion unit 71 is disposed on a bypass line branched off from a line through which the BOG is supplied from the heat exchanger 30 to the first intermediate cooler 41, and expands some of the BOG (hereinafter referred to as "Flow a1") compressed by the multistage compressor 20*a*, 20*b*, 20*c*, 20*d* and having passed through the heat exchanger 30. The first expansion unit 71 may be an expansion valve or an expander.

Some BOG (Flow a1) compressed by the multistage compressor 20*a*, 20*b*, 20*c*, 20*d* and having passed through the heat exchanger 30 is expanded by the first expansion unit 71 to a lower temperature and pressure. The BOG having passed through the first expansion unit 71 is supplied to the first intermediate cooler 41 to be used as a refrigerant for decreasing the temperature of the other BOG (hereinafter referred to as "Flow a2") compressed by the multistage compressor 20*a*, 20*b*, 20*c*, 20*d* and having passed through the heat exchanger 30.

That is, some of the BOG supplied from the heat exchanger 30 to the first intermediate cooler 41 passes through the first expansion unit 71 disposed on the bypass line, and the remaining BOG is supplied to the first intermediate cooler 41 through the reliquefaction line.

According to this exemplary embodiment, the first intermediate cooler 41 decreases the temperature of the BOG (Flow a2) having passed through the multistage compressor 20*a*, 20*b*, 20*c*, 20*d* and the heat exchanger 30 through heat exchange between some of the BOG (Flow a2) compressed by the multistage compressor 20*a*, 20*b*, 20*c*, 20*d* and having passed through the heat exchanger 30 and the BOG (Flow a1) expanded by the first expansion unit 71.

The BOG (Flow a2) decreased in temperature by the first intermediate cooler 41 after having passed through the multistage compressor 20*a*, 20*b*, 20*c*, 20*d* and the heat exchanger 30 is supplied to the gas/liquid separator 60 after having passed through the third expansion unit 73, and the BOG (Flow a1) supplied to the first intermediate cooler 41 through the first expansion unit 71 is supplied downstream of one of the compression stage parts 20*a*, 20*b*, 20*c*, 20*d*, for example, downstream of the first compression stage part 20*a* or the second compression stage part 20*b*, through a first compression stage part supply line, which connects the first intermediate cooler 41 to the multistage compressor 20, when the multistage compressor 20 is a four-stage compressor.

The BOG discharged from the first intermediate cooler 41 is merged with BOG having a similar pressure thereto among BOG subjected to multiple stages of compression through the multistage compressor 20*a*, 20*b*, 20*c*, 20*d* and is then compressed thereby.

On the other hand, since the BOG expanded by the first expansion unit 71 is used as a refrigerant for cooling the BOG in the first intermediate cooler 41, the amount of the BOG to be supplied to the first expansion unit 71 may be adjusted depending upon the degree of cooling the BOG in the first intermediate cooler 41. Here, the BOG compressed by the multistage compressor 20*a*, 20*b*, 20*c*, 20*d* and having passed through the heat exchanger 30 is divided into two flows to be supplied to the first expansion unit 71 and the first intermediate cooler 41, respectively. Thus, the ratio of BOG to be supplied to the first expansion unit 71 is increased in order to cool the BOG to a lower temperature in the first intermediate cooler 41 and is decreased in order to cool a smaller amount of BOG in the first intermediate cooler 41.

According to this exemplary embodiment, the third expansion unit 73 expands the BOG (Flow a2) having passed through the first intermediate cooler 41 to about normal pressure.

According to this exemplary embodiment, the gas/liquid separator 60 separates the BOG, which has been subjected to partial reliquefaction while passing through the third expansion unit 73, into reliquefied BOG and gaseous BOG. The gaseous BOG separated by the gas/liquid separator 60 is supplied upstream of the heat exchanger 30 to be subjected to reliquefaction together with the BOG discharged from the storage tank 10, and the reliquefied BOG separated by the gas/liquid separator 60 is returned back to the storage tank 10.

Although FIG. 6 shows that the gaseous BOG separated by the gas/liquid separator 60 is supplied upstream of the heat exchanger 30 and the reliquefied BOG separated by the gas/liquid separator 60 is returned back to the storage tank 10, it should be understood that all of the BOG having passed through the gas/liquid separator 60 can be returned to the storage tank 10 as in the second exemplary embodiment; both the gaseous BOG and the reliquefied BOG separated by the gas/liquid separator 60 can be recovered by the storage tank 10 through different lines, respectively, as in the third exemplary embodiment; both the gaseous BOG and the reliquefied BOG separated by the gas/liquid separator 60 can be supplied to the lower portion in the storage tank 10 through different lines as in the fourth exemplary embodiment; or the BOG can be directly recovered by the storage tank 10 after expansion by the third expansion unit 73 without passing through the gas/liquid separator 60 as in the fifth exemplary embodiment.

When the reliquefaction apparatus according to this exemplary embodiment is provided to a marine structure adapted to employ liquefied gas as fuel, a vaporizer 80 may be disposed between the first intermediate cooler 41 and the third expansion unit 73. The vaporizer 80 is adapted to supply liquefied gas from a fuel tank 3 storing the liquefied gas as fuel to a fuel demand site 2 such as an engine after vaporization of the liquefied gas. The vaporizer 80 vaporizes the liquefied gas supplied from the fuel tank 3 to the fuel demand site 2 through heat exchange between the BOG (Flow a2) supplied from the intermediate cooler 41 to the third expansion unit 73 and the liquefied gas supplied from the fuel tank 3 to the fuel demand site 2.

The liquefied gas fuel vaporized by the BOG in the vaporizer 80 may be supplied to the fuel demand site 2, for example, an ME-GI engine in a ship.

The fuel tank 3 may be provided in plural and the fuel supplied from the fuel tank 3 to the vaporizer 80 may be selected from the group consisting of ethane, ethylene, propylene, and LPG (liquefied petroleum gas). Thus, when the fuel tank 3 is provided in plural, the kinds of fuels stored in the fuel tanks 3 may be the same or different. Further, the kinds of fuels stored in some fuel tanks 3 may be the same and the kinds of fuels stored in the other fuel tanks 3 may be different.

Next, the flow of the BOG in the BOG reliquefaction apparatus for ships according to this exemplary embodiment will be described hereinafter with reference to FIG. 6.

The BOG discharged from the storage tank 10 passes through the heat exchanger 30 and is then compressed by the multistage compressor 20*a*, 20*b*, 20*c*, 20*d*. The BOG compressed by the multistage compressor 20*a*, 20*b*, 20*c*, 20*d* has a pressure of about 40 bar to 100 bar, or about 80 bar. The BOG compressed by the multistage compressor 20*a*, 20*b*, 20*c*, 20*d* has a supercritical fluid phase in which liquid and gas are not distinguished from each other.

The BOG having passed through the multistage compressor 20*a*, 20*b*, 20*c*, 20*d* is kept in a supercritical fluid phase with a substantially similar pressure before the third expansion unit 73 while passing through the heat exchanger 30 and the first intermediate cooler 41 or the first intermediate cooler 41 and the vaporizer 80. Here, since the BOG having passed through the multistage compressor 20*a*, 20*b*, 20*c*, 20*d* can undergo sequential decrease in temperature while passing through the heat exchanger 30 and the first intermediate cooler 41 or the first intermediate cooler 41 and the vaporizer 80, and can undergo sequential decrease in pressure depending upon an application method of processes while passing through the heat exchanger 30 and the first intermediate cooler 41 or the first intermediate cooler 41 and the vaporizer 80, the BOG may be in a gas/liquid mixed phase or in a liquid phase before the third expansion unit 73 while passing through the heat exchanger 30 and the first intermediate cooler 41 or the first intermediate cooler 41 and the vaporizer 80.

The BOG having passed through the multistage compressor 20*a*, 20*b*, 20*c*, 20*d* is supplied again to the heat exchanger 30 to be subjected to heat exchange with the BOG discharged from the storage tank 10. The BOG (Flow a) having passed through the multistage compressor 20*a*, 20*b*, 20*c*, 20*d* and the heat exchanger 30 may have a temperature of about −10° C. to 35° C.

Among the BOG having passed through the multistage compressor 20*a*, 20*b*, 20*c*, 20*d* and the heat exchanger 30, some BOG (Flow a1) is supplied to the first expansion unit 71 disposed on the bypass line and the other BOG (Flow a2) is supplied to the first intermediate cooler 41 through the reliquefaction line. The BOG (Flow a1) supplied to the first expansion unit 71 is expanded to a lower temperature and pressure and is then supplied to the first intermediate cooler 41, and the other BOG (Flow a2) supplied to the first intermediate cooler 41 through the heat exchanger 30 is decreased in temperature through heat exchange with the BOG (Flow a1) having passed through the first expansion unit 71.

That is, the BOG supplied to the first intermediate cooler 41 through the first expansion unit 71 disposed on the bypass line is in a low temperature state and thus cools the BOG supplied to the first intermediate cooler 41 through the reliquefaction line. The BOG having passed through the first expansion unit 71 and the first intermediate cooler 71 is supplied to the multistage compressor 20 through a compressor supply line.

The BOG (Flow a1) branched off from the BOG having passed through the heat exchanger 30 and supplied to the first expansion unit 71 is expanded to a gas/liquid mixed phase by the first expansion unit 71. The BOG expanded to the gas/liquid mixed phase by the first expansion unit 71 is converted into a gas phase through heat exchange in the first intermediate cooler 41.

The BOG (Flow a2) obtained in the first intermediate cooler 41 through heat exchange with the BOG having passed through the first expansion unit 71 is supplied to the vaporizer 80 through the reliquefaction line. The BOG supplied to the vaporizer 80 through the first intermediate cooler 41 is decreased in temperature while vaporizing the liquefied gas fuel supplied from the fuel tank 3 to the fuel demand site 2 through heat exchange with the liquefied gas fuel supplied from the fuel tank 3 to the fuel demand site 2.

Then, the BOG subjected to heat exchange with the liquefied gas fuel in the vaporizer 80 is partially reliquefied through expansion to about normal pressure and a lower temperature by the third expansion unit 73. Through this process, the BOG phase changes to a gas-liquid mixture. The BOG having passed through the third expansion unit 73 is supplied to the gas/liquid separator 60, in which the BOG is separated into reliquefied BOG and gaseous BOG. The reliquefied BOG is supplied to the storage tank 10 and the gaseous BOG is supplied upstream of the heat exchanger 30.

Figure 7:
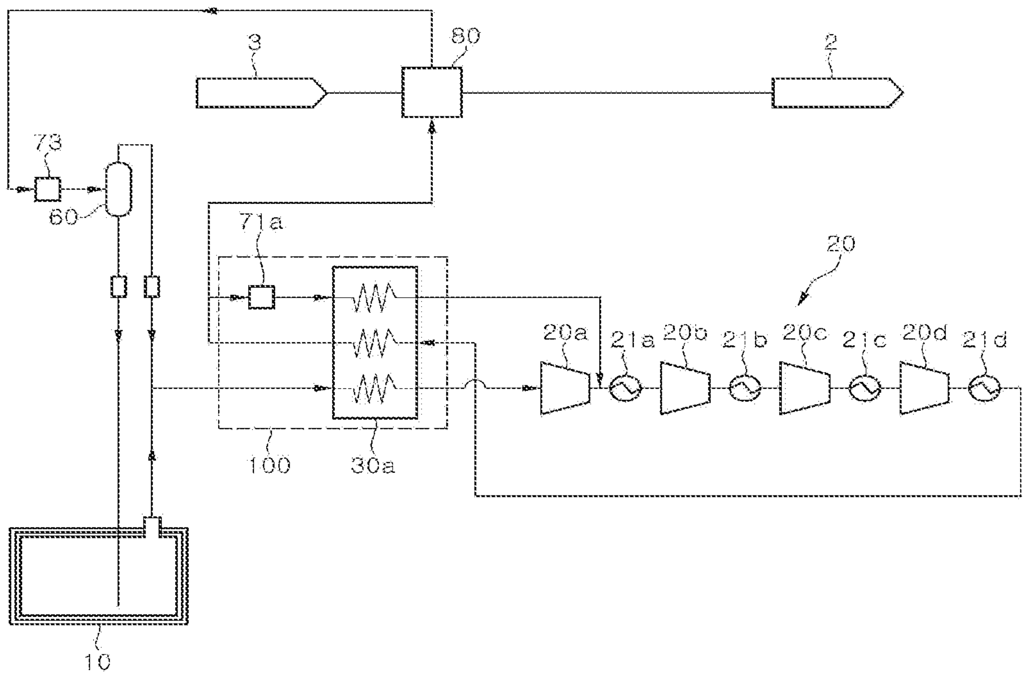
FIG. 7 is a schematic diagram of a BOG reliquefaction apparatus for ships according to a seventh exemplary embodiment of the present invention.

FIG. 7 is a schematic diagram of a BOG reliquefaction apparatus for ships according to a seventh exemplary embodiment of the present invention.

The BOG reliquefaction apparatus for ships according to the seventh exemplary embodiment shown in FIG. 7 is distinguished from the BOG reliquefaction apparatus for ships according to the sixth exemplary embodiment shown in FIG. 6 in that, as the heat exchange unit 100, a multistream heat exchanger 30*a* is disposed between the storage tank 10 and a compressor 20 and a multistream expansion unit 71*a* is disposed upstream of the multistream heat exchanger 30*a*. The following description will focus on the different features between the seventh exemplary embodiment shown in FIG. 7 and the sixth exemplary embodiment shown in FIG. 6. Detailed descriptions of the same components and functions as those of the BOG reliquefaction apparatus for ships according to the sixth exemplary embodiment will be omitted.

As in the above exemplary embodiments, the BOG downstream of the first compression stage part 20*a* may have a pressure of 2 bar to 5 bar, for example, 3.5 bar, and the BOG downstream of the second compression stage part 20*b* may have a pressure of 10 bar to 15 bar, for example, 12 bar. In addition, the BOG downstream of the third compression stage part 20*c* may have a pressure of 25 bar to 35 bar, for example, 30.5 bar, and the BOG downstream of the fourth compression stage part 20*d* may have a pressure of 75 bar to 90 bar, for example, 83.5 bar.

Likewise, the fuel tank 3 may be provided in plural and the fuel supplied from the fuel tank 3 to the vaporizer 80 may be selected from the group consisting of ethane, ethylene, propylene, and LPG (liquefied petroleum gas). Thus, when the fuel tank 3 is provided in plural, the kinds of fuels stored in the fuel tanks 3 may be the same or different. Further, the kinds of fuels stored in some fuel tanks 3 may be the same and the kinds of fuels stored in the other fuel tanks 3 may be different.

Next, the flow of the BOG in the BOG reliquefaction apparatus for ships according to this exemplary embodiment will be described hereinafter with reference to FIG. 7.

In this exemplary embodiment, the BOG (Flow a) supplied from the storage tank 10 to the compressor 20 through the multistream heat exchanger 30*a* and then compressed by and discharged from the compressor 20 is supplied again to the multistream heat exchanger 30*a* to be subjected to primary heat exchange in the heat exchanger 30*a*, and the BOG (Flow a1) branched off from the BOG (Flow a) is supplied to the multistream heat exchanger 30*a* after expansion by the multistream expansion unit 71*a* and cools the BOG compressed by the compressor 20 together with the BOG supplied from the storage tank 10 to the compressor 20.

That is, the BOG (Flow a) supplied from the compressor 20 is cooled through heat exchange with the BOG supplied from the storage tank 10 to the multistream heat exchanger 30*a*. This is because the BOG discharged from the storage tank 10 has an extremely low temperature approaching the boiling point thereof, whereas the BOG supplied from the compressor 20 has a relatively high temperature due to temperature increase through compression in the compressor 20.

Some BOG (Flow a2) cooled by the multistream heat exchanger 30*a* is subjected to the same process as in the sixth exemplary embodiment while passing through the vaporizer 80, the third expansion unit 73, and the gas/liquid separator 60.

On the other hand, among the BOG cooled by the multistream heat exchanger 30*a*, the remaining BOG (Flow a1) excluding the BOG supplied to the vaporizer 80 is supplied to the multistream expansion unit 71*a* to be subjected to expansion thereby and is then supplied again to the multistream heat exchanger 30*a*. Here, the BOG supplied to the multistream heat exchanger 30*a* is subjected to secondary heat exchange.

That is, the BOG (Flow a1) supplied to the multistream heat exchanger 30*a* through the multistream expansion unit 71*a* has a relatively low temperature to cool the BOG (Flow a) supplied from the compressor 20 to the multistream heat exchanger 30*a* through heat exchange with the BOG (Flow a) supplied from the compressor 20 to the multistream heat exchanger 30*a*.

That is, the BOG (Flow a) supplied from the compressor 20 to the multistream heat exchanger 30*a* is cooled (primary heat exchange) by the BOG supplied from the storage tank 10 to the multistream heat exchanger 30*a* and is cooled (secondary heat exchange) by the BOG (Flow a1) expanded by the multistream expansion unit 71*a*.

Here, when the temperature of the BOG supplied to the multistream heat exchanger 30*a* through the multistream expansion unit 71*a* is lower than the BOG supplied from the storage tank 10 to the multistream heat exchanger 30*a*, the BOG supplied from the compressor 20 to the multistream heat exchanger 30*a* can be cooled through sequential heat exchange of primary and second heat exchange in order to secure efficient cooling in the multistream heat exchanger 30*a*.

Figure 8:
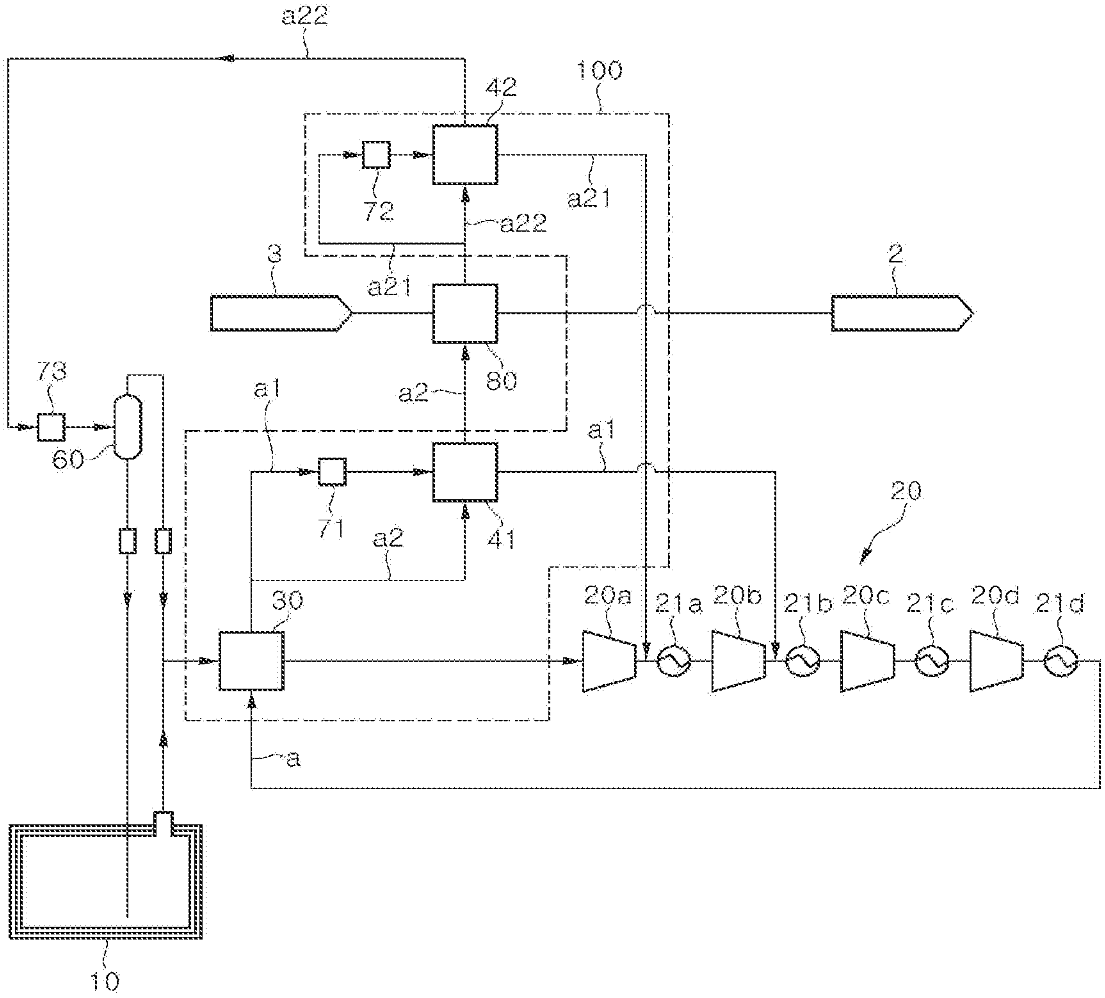
FIG. 8 is a schematic diagram of a BOG reliquefaction apparatus for ships according to an eighth exemplary embodiment of the present invention.

FIG. 8 is a schematic diagram of a BOG reliquefaction apparatus for ships according to an eighth exemplary embodiment of the present invention.

The BOG reliquefaction apparatus for ships according to the eighth exemplary embodiment shown in FIG. 8 is distinguished from the BOG reliquefaction apparatus for ships according to the sixth exemplary embodiment shown in FIG. 6 in that the BOG reliquefaction apparatus for ships according to the eighth exemplary embodiment further includes a second intermediate cooler 42 and a second expansion unit 72, and the following description will focus on the different features of the eighth exemplary embodiment. Detailed descriptions of the same components and functions as those of the BOG reliquefaction apparatus for ships according to the sixth exemplary embodiment will be omitted.

Referring to FIG. 8, as in the sixth exemplary embodiment, the BOG reliquefaction apparatus for ships according to the eighth exemplary embodiment includes: a storage tank 10; a multistage compressor 20; a heat exchange unit 100; a third expansion unit 73; and a gas/liquid separator 60, in which the heat exchange unit 100 includes a heat exchanger 30, a first expansion unit 71 and a first intermediate cooler 41, and may further include a vaporizer 70. The reliquefaction apparatus for ships according to this exemplary embodiment further includes a fuel tank 2 supplying liquefied gas fuel to the vaporizer 70 and a fuel demand site 2 receiving the liquefied gas fuel having passed through the vaporizer 70.

According to this exemplary embodiment, the heat exchange unit 100 further includes the second expansion unit 72 and the second intermediate cooler 42.

In this exemplary embodiment, a line to which the storage tank 10, the multistage compressor 20, the heat exchange unit 100, the third expansion unit 73, and the gas/liquid separator 60 are provided will be referred to as a "reliquefaction line", and provide a path through which the BOG discharged from the storage tank 10 is reliquefied and returned in a liquid phase to the storage tank 10.

As in the sixth exemplary embodiment, the storage tank 10 according to this exemplary embodiment stores liquefied gas, such as ethane, ethylene, and the like, and discharges BOG, which is generated through vaporization of the liquefied gas by heat transferred from the outside, when the internal pressure of the storage tank 10 exceeds a predetermined pressure.

In addition, as in the sixth exemplary embodiment, the BOG discharged from the storage tank 10 passes through the heat exchanger 30 and is compressed by the multistage compressor 20*a*, 20*b*, 20*c*, 20*d*, and a plurality of coolers 21*a*, 21*b*, 21*c*, 21*d* may be disposed downstream of the plurality of compression stage parts of the multistage compressor 20*a*, 20*b*, 20*c*, 20*d*, respectively, to decrease the temperature of the BOG, which is increased not only in pressure but also in temperature after passing through each of the compression stage parts 20*a*, 20*b*, 20*c*, 20*d*.

As in the sixth exemplary embodiment, when the multistage compressor 20 is a four-stage compressor including four compression stage parts, the multistage compressor 20 includes a first compression stage part 20*a*, a second compression stage part 20*b*, a third compression stage part 20*c*, and a fourth compression stage part 20*d*, which are arranged in series to sequentially compress. The BOG downstream of the first compression stage part 20*a* may have a pressure of 2 bar to 5 bar, for example, 3.5 bar, and the BOG downstream of the second compression stage part 20*b* may have a pressure of 10 bar to 15 bar, for example, 12 bar. In addition, the BOG downstream of the third compression stage part 20*c* may have a pressure of 25 bar to 35 bar, for example, 30.5 bar, and the BOG downstream of the fourth compression stage part 20*d* may have a pressure of 75 bar to 90 bar, for example, 83.5 bar.

According to this exemplary embodiment, the heat exchanger 30 cools the BOG (hereinafter referred to as “Flow a”) compressed by the multistage compressor 20*a*, 20*b*, 20*c*, 20*d* through heat exchange between the BOG compressed by the multistage compressor 20*a*, 20*b*, 20*c*, 20*d* and the BOG discharged from the storage tank 10. That is, the BOG (Flow a) compressed to a high pressure by the multistage compressor 20*a*, 20*b*, 20*c*, 20*d* is decreased in temperature by the heat exchanger 30 using the BOG discharged from the storage tank 10 as a refrigerant.

According to this exemplary embodiment, the first expansion unit 71 is disposed on a bypass line branched off from a line through which the BOG is supplied from the heat exchanger 30 to the first intermediate cooler 41, and expands some of the BOG (hereinafter referred to as “Flow a1”) compressed by the multistage compressor 20*a*, 20*b*, 20*c*, 20*d* and having passed through the heat exchanger 30. The first expansion unit 71 may be an expansion valve or an expander.

As in the sixth exemplary embodiment, some BOG (Flow a1) compressed by the multistage compressor 20*a*, 20*b*, 20*c*, 20*d* and having passed through the heat exchanger 30 is expanded to a lower temperature and pressure by the first expansion unit 71. The BOG (Flow a1) having passed through the first expansion unit 71 is supplied to the first intermediate cooler 41 to be used as a refrigerant for decreasing the temperature of the other BOG (hereinafter referred to as “Flow a2”) compressed by the multistage compressor 20*a*, 20*b*, 20*c*, 20*d* and having passed through the heat exchanger 30.

That is, some of the BOG supplied from the heat exchanger 30 to the first intermediate cooler 41 passes through the first expansion unit 71 disposed on the bypass line, and the remaining BOG is supplied to the first intermediate cooler 41 through the reliquefaction line.

According to this exemplary embodiment, the first intermediate cooler 41 decreases the temperature of the BOG (Flow a2) having passed through the multistage compressor 20*a*, 20*b*, 20*c*, 20*d* and the heat exchanger 30 through heat exchange between some of the BOG (Flow a2) compressed by the multistage compressor 20*a*, 20*b*, 20*c*, 20*d* and having passed through the heat exchanger 30 and the BOG (Flow a1) expanded by the first expansion unit 71.

In addition, as in the sixth exemplary embodiment, when the reliquefaction apparatus according to this exemplary embodiment is provided to a marine structure adapted to employ liquefied gas as fuel, the vaporizer 80 may be disposed between the first intermediate cooler 41 and the third expansion unit 73. The vaporizer 80 is adapted to supply liquefied gas from the fuel tank 3 storing the liquefied gas as fuel to the fuel demand site 2 such as an engine after vaporization of the liquefied gas. The vaporizer 80 vaporizes the liquefied gas supplied from the fuel tank 3 to the fuel demand site 2 through heat exchange between the BOG (Flow a2) supplied from the intermediate cooler 41 to the third expansion unit 73 and the liquefied gas supplied from the fuel tank 3 to the fuel demand site 2.

The liquefied gas fuel vaporized by the BOG in the vaporizer 80 may be supplied to the fuel demand site 2, for example, an ME-GI engine in a ship.

The fuel tank 3 may be provided in plural and the fuel supplied from the fuel tank 3 to the vaporizer 80 may be selected from the group consisting of ethane, ethylene, propylene, and LPG (liquefied petroleum gas). Thus, when the fuel tank 3 is provided in plural, the kinds of fuels stored in the fuel tanks 3 may be the same or different. Further, the kinds of fuels stored in some fuel tanks 3 may be the same and the kinds of fuels stored in the other fuel tanks 3 may be different.

Unlike the sixth exemplary embodiment, according to this exemplary embodiment, among the BOG (Flow a2) decreased in temperature while vaporizing the liquefied gas fuel supplied from the fuel tank 3 in the vaporizer 80, some BOG (Flow a21) is supplied to the second expansion unit 72 through a second bypass line branched off from the reliquefaction line, and the other BOG (Flow a22) is supplied to the second intermediate cooler 42 through the reliquefaction line. The BOG (Flow a21) supplied to the second expansion unit 72 is expanded to a lower temperature and pressure and is then supplied to the second intermediate cooler 42, and the BOG (Flow a22) supplied to the second intermediate cooler 42 through the first intermediate cooler 41 and the vaporizer 80 is decreased in temperature through heat exchange with the BOG (Flow a21) having passed through the second expansion unit 72.

The BOG (Flow a22) decreased in temperature by the first intermediate cooler 41, the vaporizer 80 and the second intermediate cooler 42 after passing through the multistage compressor 20*a*, 20*b*, 20*c*, 20*d* and the heat exchanger 30 is supplied to the gas/liquid separator 60 through the third expansion unit 73, and each of the BOG (Flow a1) supplied to the first intermediate cooler 41 through the first expansion unit 71 and the BOG (Flow a21) having passed through the second expansion unit 72 and the second intermediate cooler 42 is separately supplied to one of the plurality of compression stage parts 20*a*, 20*b*, 20*c*, 20*d* through a first compression stage part supply line connecting the first intermediate cooler 41 to the multistage compressor 20 or a second compression stage part supply line connecting the second intermediate cooler 42 to the multistage compressor 20.

Here, the BOG (Flow a1) having passed through the first expansion unit 71 and the first intermediate cooler 41 is supplied to a compression stage part disposed farther downstream than the compression stage part to which the BOG (Flow a21) having passed through the second expansion unit 72 and the second intermediate cooler 42 is supplied.

This is because decompression of the BOG occurs more significantly in the second expansion unit 72 than in the first expansion unit 71 in order to allow the BOG cooled while passing through the first intermediate cooler 41 and the vaporizer 80 to be further cooled by the second intermediate cooler 42. Accordingly, among the plurality of compression stage parts 20*a*, 20*b*, 20*c*, 20*d* in the multistage compressor 20, the BOG (Flow a21) having passed through the second expansion unit 72 and the second intermediate cooler 42 is supplied to a compression stage part disposed farther upstream than the compression stage part to which the BOG (Flow a21) having passed through the first expansion unit 71 and the first intermediate cooler 41 is supplied, thereby enabling greater compression.

For example, when the compressor 20 is a four-stage compressor, the BOG (Flow a1) having passed through the first expansion unit 71 and the first intermediate cooler 41 may be supplied to downstream of the second compression stage part 20*b*, or the third compression stage part 20*c*, and the BOG (Flow a21) having passed through the second expansion unit 72 and the second intermediate cooler 42 may be supplied downstream of the first compression stage part 20*a*.

That is, the BOG (Flow a1) having passed through the first expansion unit 71 and the first intermediate cooler 41 and the BOG (Flow a21) having passed through the second expansion unit 72 and the second intermediate cooler 42 is merged with BOG having a similar pressure thereto among BOG subjected to multiple stages of compression through the multistage compressor 20*a*, 20*b*, 20*c*, 20*d* and is then compressed thereby.

On the other hand, since the BOG expanded by the first expansion unit 71 and the second expansion unit 72 is used as a refrigerant for cooling the BOG in the first intermediate cooler 41 and the second intermediate cooler 42, the amounts of the BOG to be supplied to the first intermediate cooler 41 and the second intermediate cooler 42 may be adjusted depending upon the degree of cooling the BOG in the first intermediate cooler 41 and the second intermediate cooler 42. Here, the BOG compressed by the multistage compressor 20*a*, 20*b*, 20*c*, 20*d* and having passed through the heat exchanger 30 is divided into two flows to be supplied to the first expansion unit 71 and the first intermediate cooler 41, respectively. Thus, the ratio of BOG to be supplied to the first expansion unit 71 is increased in order to cool the BOG to a lower temperature in the first intermediate cooler 41 and is decreased in order to cool a smaller amount of BOG in the first intermediate cooler 41.

Like the BOG supplied from the heat exchanger 30 to the first intermediate cooler 41, when the BOG is supplied from the first intermediate cooler 41 to the second intermediate cooler 42, the ratio of BOG to be supplied to the second expansion unit 72 is increased in order to cool the BOG to a lower temperature in the second intermediate cooler 42 and the ratio of BOG to be supplied to the second expansion unit 72 is decreased in order to cool a smaller amount of BOG in the second intermediate cooler 42.

In this exemplary embodiment, the reliquefaction apparatus includes two intermediate coolers 41, 42 and two expansion units 71, 72 disposed upstream of the intermediate coolers 41, 42, respectively. However, it should be noted that the number of intermediate coolers and the number of expansion units disposed upstream of the intermediate coolers can be changed, as needed. In addition, the intermediate coolers 41, 42 according to this exemplary embodiment may be intermediate coolers for ships, as shown in FIG. 1, or may be typical heat exchangers.

As in the sixth exemplary embodiment, the BOG subjected to heat exchange with the BOG having passed through the second expansion unit 72 in the second intermediate cooler 42 is partially reliquefied through expansion to about normal pressure and a lower temperature by the third expansion unit 73. The BOG having passed through the third expansion unit 73 is supplied to the gas/liquid separator 60, in which the BOG is separated into reliquefied BOG and gaseous BOG.

According to this exemplary embodiment, the gas/liquid separator 60 separates the BOG, which has been subjected to partial reliquefaction while passing through the third expansion unit 73, into reliquefied BOG and gaseous BOG. The gaseous BOG separated by the gas/liquid separator 60 is supplied upstream of the heat exchanger 30 to be subjected to reliquefaction together with the BOG discharged from the storage tank 10, and the reliquefied BOG separated by the gas/liquid separator 60 is returned back to the storage tank 10.

Although FIG. 8 shows that the gaseous BOG separated by the gas/liquid separator 60 is supplied upstream of the heat exchanger 30 and the reliquefied BOG separated by the gas/liquid separator 60 is returned back to the storage tank 10, it should be understood that all of the BOG having passed through the gas/liquid separator 60 can be returned to the storage tank 10 as in the second exemplary embodiment; both the gaseous BOG and the reliquefied BOG separated by the gas/liquid separator 60 can be recovered by the storage tank 10 through different lines, respectively, as in the third exemplary embodiment; both the gaseous BOG and the reliquefied BOG separated by the gas/liquid separator 60 can be supplied to the lower portion in the storage tank 10 through different lines as in the fourth exemplary embodiment; or the BOG can be directly recovered by the storage tank 10 after expansion by the third expansion unit 73 without passing through the gas/liquid separator 60 as in the fifth exemplary embodiment.

In this exemplary embodiment, the reliquefaction apparatus includes two intermediate coolers 41, 42 and two expansion units 71, 72 disposed upstream of the intermediate coolers 41, 42, respectively. However, it should be noted that the number of intermediate coolers and the number of expansion units disposed upstream of the intermediate coolers can be changed, as needed. In addition, the intermediate coolers 41, 42 according to this exemplary embodiment may be intermediate coolers for ships, or may be typical heat exchangers.

Next, the flow of the BOG in the BOG reliquefaction apparatus for ships according to this exemplary embodiment will be described hereinafter with reference to FIG. 8.

The BOG discharged from the storage tank 10 passes through the heat exchanger 30 and is then compressed by the multistage compressor 20*a*, 20*b*, 20*c*, 20*d*. The BOG compressed by the multistage compressor 20*a*, 20*b*, 20*c*, 20*d* has a pressure of about 40 bar to 100 bar, or about 80 bar. The BOG compressed by the multistage compressor 20*a*, 20*b*, 20*c*, 20*d* has a supercritical fluid phase in which liquid and gas are not distinguished from each other.

The BOG having passed through the multistage compressor 20*a*, 20*b*, 20*c*, 20*d* is kept in a supercritical fluid phase with a substantially similar pressure before the third expansion unit 73 while passing through the heat exchanger 30, the first intermediate cooler 41, the vaporizer 80 and the second intermediate cooler 42. Here, since the BOG having passed through the multistage compressor 20*a*, 20*b*, 20*c*, 20*d* can undergo sequential decrease in temperature while passing through the heat exchanger 30, the first intermediate cooler 41, the vaporizer 80 and the second intermediate cooler 42, and can undergo sequential decrease in pressure depending upon an application method of processes while passing through the heat exchanger 30, the first intermediate cooler 41, the vaporizer 80 and the second intermediate cooler 42, the BOG may be in a gas/liquid mixed phase or in a liquid phase before the third expansion unit 73 while passing through the heat exchanger 30, the first intermediate cooler 41, the vaporizer 80 and the second intermediate cooler 42.

The BOG having passed through the multistage compressor 20*a*, 20*b*, 20*c*, 20*d* is supplied again to the heat exchanger 30 to be subjected to heat exchange with the BOG discharged from the storage tank 10. The BOG (Flow a) having passed through the multistage compressor 20*a*, 20*b*, 20*c*, 20*d* and the heat exchanger 30 may have a temperature of about −10° C. to 35° C.

Among the BOG (Flow a) having passed through multistage compressor 20*a*, 20*b*, 20*c*, 20*d* and the heat exchanger 30, some BOG (Flow a1) is supplied to the first expansion unit 71 disposed on the bypass line and the other BOG (Flow a2) is supplied to the first intermediate cooler 41. The BOG (Flow a1) supplied to the first expansion unit 71 is expanded to a lower temperature and pressure and is then supplied to the first intermediate cooler 41, and the other BOG (Flow a2) supplied to the first intermediate cooler 41 through the heat exchanger 30 is decreased in temperature through heat exchange with the BOG having passed through the first expansion unit 71.

The BOG (Flow a1) branched off from the BOG having passed through the heat exchanger 30 and supplied to the first expansion unit 71 is expanded to a gas/liquid mixed phase by the first expansion unit 71. The BOG expanded to the gas/liquid mixed phase by the first expansion unit 71 is converted into a gas phase through heat exchange in the first intermediate cooler 41.

The BOG (Flow a2) obtained in the first intermediate cooler 41 through heat exchange with the BOG having passed through the first expansion unit 71 is supplied to the vaporizer 80, in which the BOG is cooled while vaporizing the liquefied gas fuel. Then, some BOG (Flow a21) is supplied to the second expansion unit 72 and the other BOG (Flow a22) is supplied to the second intermediate cooler 42. The BOG (Flow a21) supplied to the second expansion unit 72 is expanded to decrease the temperature and pressure thereof and is then supplied to the second intermediate cooler 42, and the BOG (Flow a22) supplied to the second intermediate cooler 42 through the first intermediate cooler 41 is decreased in temperature through heat exchange with the BOG having passed through the second expansion unit 72.

Like the BOG (Flow a1) supplied to the first expansion unit 71 through the heat exchanger 30, some BOG (Flow a21) supplied to the second expansion unit 72 through the first intermediate cooler 41 and the vaporizer 80 may be expanded to a gas/liquid mixed phase by the second expansion unit 72. The BOG expanded to the gas/liquid mixed phase by the second expansion unit 72 is changed to a gas phase through heat exchange in the second intermediate cooler 42.

The BOG (Flow a22) subjected to heat exchange with the BOG having passed through the second expansion unit 72 in the second intermediate cooler 42 is partially reliquefied through expansion to about normal pressure and a lower temperature by the third expansion unit 73. The BOG having passed through the third expansion unit 73 is supplied to the gas/liquid separator 60, in which the BOG is separated into reliquefied BOG and gaseous BOG. The reliquefied BOG is supplied to the storage tank 10 and the gaseous BOG is supplied to the heat exchanger 30 or the storage tank 10.

Figure 9:
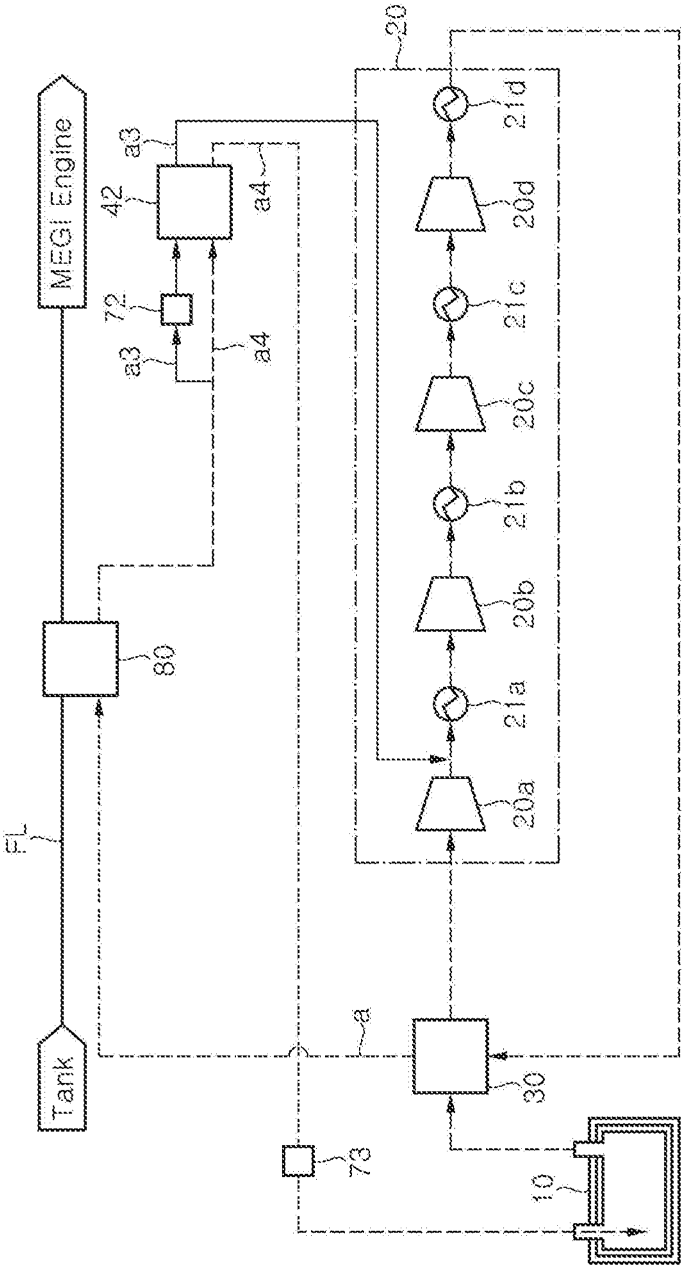
FIG. 9 is a schematic diagram of a BOG reliquefaction apparatus for ships according to a ninth exemplary embodiment of the present invention.

FIG. 9 is a schematic diagram of a BOG reliquefaction apparatus for ships according to a ninth exemplary embodiment of the present invention. The ninth exemplary embodiment shown in FIG. 9 is a modification of the sixth exemplary embodiment shown in FIG. 6 and the eighth exemplary embodiment shown in FIG. 8. Herein, detailed descriptions of the same components as those of the BOG reliquefaction apparatus for ships according to the sixth and eighth exemplary embodiments will be omitted.

In the BOG reliquefaction apparatus for ships according to the sixth exemplary embodiment shown in FIG. 6, the BOG supplied to the vaporizer 80 through the heat exchanger 30 is further cooled in the first intermediate cooler 41 and is then supplied to the vaporizer 80, and in the BOG reliquefaction apparatus for ships according to the eighth exemplary embodiment shown in FIG. 8, the BOG cooled while passing through the heat exchanger 30 is further cooled in the first intermediate cooler 41, further cooled in the vaporizer 80 while vaporizing liquefied gas to be supplied to the fuel demand site, and further cooled in the second intermediate cooler 42 after passing through the vaporizer 80. On the other hand, in the BOG reliquefaction apparatus for ships according to the ninth exemplary embodiment shown in FIG. 9, the BOG having passed through the heat exchanger 30 is supplied to the vaporizer 80, in which the BOG is cooled while vaporizing liquefied gas to be supplied to the fuel demand site, and the BOG cooled in the vaporizer is further cooled in the second intermediate cooler 42.

It will be apparent to those skilled in the art that the present invention is not limited to the embodiments described above and various modifications, changes, alterations, and equivalent embodiments can be made without departing from the spirit and scope of the present invention.

The invention claimed is:

1. A method of operating a ship comprising a cargo storage tank storing liquefied cargo gas, an engine, a fuel tank storing liquefied fuel for the engine, and a fuel vaporizer for vaporizing liquefied fuel from the fuel tank for supplying to the engine, wherein the method comprises:

compressing, at a multistage compressor, boil-off gas (BOG) discharged from the cargo storage tank to provide compressed BOG (CBOG);

cooling, at a first heat exchanger, a flow of the CBOG from the multistage compressor by heat exchanging with a flow of the BOG flowing from the cargo storage tank to the multistage compressor to provide a flow of cooled CBOG;

branching off, from the flow of cooled CBOG, a first flow of cooled CBOG and a second flow of cooled CBOG;

expanding, at a first expansion unit, the first flow of cooled CBOG to further cool the first flow;

cooling, in a second heat exchanger, the second flow of cooled CBOG by heat exchange with the first flow from the first expansion unit;

cooling, at the fuel vaporizer, a cooled second flow from the second heat exchanger by heat exchange with liquefied fuel from the fuel tank to further cool the cooled second flow; and expanding, at a second expansion unit, the further cooled second flow from the fuel vaporizer to reliquefy at least portion of the further cooled second flow for returning to the cargo storage tank, wherein at the fuel vaporizer, the cooled second flow from the second heat exchanger is further cooled by heat exchange with the liquefied fuel before the further cooled second flow is sent to the second expansion unit whereas the liquefied fuel is heated and gasified by heat exchange with the cooled second flow from the second heat exchanger such that the gasified fuel is supplied to the engine, wherein the multistage compressor comprises a first compressor, a second compressor, and a first cooler interposed between the first compressor and the second compressor, wherein that a flow of the BOG compressed at the first compressor is cooled at the first cooler prior to further compression at the second compressor;

wherein the method further comprises returning the first flow that cooled the second flow at the second heat exchanger, to a point of the multistage compressor between the first compressor and the first cooler.

2. The method of claim 1, wherein BOG from the cargo storage tank is compressed at the first compressor to a pressure in a range of 2 to 5 bar.

3. The method of claim 2, wherein BOG from the cargo storage tank is compressed at the second compressor to a pressure in a range of 10 to 15 bar.

4. The method of claim 3, wherein BOG from the cargo storage tank is compressed at the multistage compressor to a pressure in a range of 75 to 90 bar.

5. The method of claim 1, wherein the ship further comprise a separator downstream the second expansion unit, wherein the separator separates, from the second flow from downstream the second expansion unit, a flow of re-liquefied BOG and a flow of gaseous BOG, wherein the flow of gaseous BOG from the separator is merged with BOG from the cargo storage tank upstream the first heat exchanger.

6. A method of operating a ship comprising a cargo storage tank storing liquefied cargo gas, an engine, a fuel tank storing liquefied fuel for the engine, and a fuel vaporizer for vaporizing liquefied fuel from the fuel tank for supplying to the engine, wherein the method comprises:

compressing, at a multistage compressor, boil-off gas (BOG) discharged from the cargo storage tank to provide compressed BOG (CBOG);

cooling, at a first heat exchanger, a flow of the CBOG from the multistage compressor by heat exchanging with a flow of the BOG flowing from the cargo storage tank to the multistage compressor to provide a flow of cooled CBOG;

branching off, from the flow of cooled CBOG, a first flow of cooled CBOG and a second flow of cooled CBOG;

expanding, at a first expansion unit, the first flow of cooled CBOG to further cool the first flow;

cooling, in a second heat exchanger, the second flow of cooled CBOG by heat exchange with the first flow from the first expansion unit;

cooling, at the fuel vaporizer, a cooled second flow from the second heat exchanger by heat exchange with liquefied fuel from the fuel tank to further cool the cooled second flow; and branching off, from the further cooled second flow flowing downstream the fuel vaporizer, a third flow and a fourth flow;

expanding, at a second expansion unit, the third flow to cool the third flow;

heat exchanging, at a third heat exchanger, the cooled third flow from the second expansion unit with the fourth flow to cool the fourth flow;

expanding, at a third expansion unit, the cooled fourth flow from the third heat exchanger to re-liquefy at least portion of the cooled fourth flow for returning to the cargo storage tank, wherein at the fuel vaporizer, the cooled second flow from the second heat exchanger is further cooled by heat exchange with the liquefied fuel before the further cooled second flow is sent to the second expansion unit and the third heat exchanger whereas the liquefied fuel is heated and gasified by heat exchange with the cooled second flow from the second heat exchanger such that the gasified fuel is supplied to the engine, wherein the multistage compressor comprises a first compressor, a second compressor, a third compressor, a first cooler interposed between the first compressor and the second compressor and configure to cool compressed BOG from the first compressor, and a second cooler interposed between the second compressor and the third compressor and configure to cool compressed BOG from the second compressor, wherein the method further comprises:

returning the first flow that cooled the second flow at the second heat exchanger, to a point of the multistage compressor between the second compressor and the second cooler; and returning the third flow that cooled the fourth flow at the third heat exchanger, to a point of the multistage compressor between the first compressor and the first cooler.

* * * * *